United States Patent
Laird et al.

(10) Patent No.: US 10,094,702 B2
(45) Date of Patent: Oct. 9, 2018

(54) SYSTEM, METHOD, AND COMPUTER READABLE MEDIUM FOR DETERMINING THE WEIGHT OF ITEMS IN NON-SINGULATED AND NON-SPACED ARRANGEMENTS ON A CONVEYOR SYSTEM

(71) Applicant: PUROLATOR INC., Mississauga (CA)

(72) Inventors: James Cameron Laird, Mississauga (CA); Andrew Silerio Vicencio, Barrie (CA); Kirk Edward Serjeantson, Markham (CA); Theodore Pribytkov, Mississauga (CA)

(73) Assignee: PUROLATOR INC., Mississauga, Ontario (CA)

( * ) Notice: Subject to any disclaimer, the term of this patent is extended or adjusted under 35 U.S.C. 154(b) by 0 days.

(21) Appl. No.: 14/868,228

(22) Filed: Sep. 28, 2015

(65) Prior Publication Data
US 2016/0252387 A1    Sep. 1, 2016

Related U.S. Application Data

(63) Continuation-in-part of application No. 13/651,888, filed on Oct. 15, 2012, now Pat. No. 9,146,146.

(51) Int. Cl.
*G01G 19/414*  (2006.01)
*G01G 19/03*   (2006.01)

(52) U.S. Cl.
CPC ....... *G01G 19/035* (2013.01); *G01G 19/4148* (2013.01)

(58) Field of Classification Search
CPC .................. G01G 19/035; G01G 19/4148
See application file for complete search history.

(56) References Cited

U.S. PATENT DOCUMENTS

| | | | | |
|---|---|---|---|---|
| 4,437,561 A | * | 3/1984 | Hasegawa | G01G 11/00 177/145 |
| 4,709,770 A | * | 12/1987 | Kohashi | G01G 3/1414 177/185 |
| 4,754,822 A | * | 7/1988 | Altenpohl | G01G 11/046 177/145 |
| 6,346,680 B1 | * | 2/2002 | Takahashi | G01B 7/287 177/1 |
| 6,433,288 B1 | * | 8/2002 | Olafsson | G01G 11/046 177/145 |

(Continued)

*Primary Examiner* — Randy Gibson
(74) *Attorney, Agent, or Firm* — Fasken Martineau DuMoulin LLP

(57) ABSTRACT

A weight determining system is for use with non-singulated and non-spaced arrangements of items on a conveyor system. The system includes an array of load cells, a scanning apparatus, and processors. Each of the items bears upon one or more of the load cells. Each of the load cells bears one or more of the items, and generates load data associated with them. The scanning apparatus generates scan data for the arrangements of the items on the conveyor. Based on the scan data, the processors: apportion the load data from each load cell to the items bearing on it; allocate to each item the load data apportioned from the various load cells; and determine a weight for each item. Also disclosed are a corresponding weight determining method, as well as a computer readable medium containing executable instructions to encode the processors to perform as aforesaid.

50 Claims, 22 Drawing Sheets

(56) References Cited

U.S. PATENT DOCUMENTS

| | | | | |
|---|---|---|---|---|
| 6,603,082 B1* | 8/2003 | Delbruck | | G01G 19/414 |
| | | | | 177/132 |
| 7,279,644 B1* | 10/2007 | Kasel | | G01G 11/00 |
| | | | | 177/125 |
| 7,279,645 B1* | 10/2007 | Inglin | | G01G 11/046 |
| | | | | 177/145 |
| 7,586,049 B2* | 9/2009 | Wurz | | G01G 11/00 |
| | | | | 177/145 |
| 8,134,090 B2* | 3/2012 | Duppre | | G01G 11/043 |
| | | | | 177/145 |
| 8,237,067 B2* | 8/2012 | Troisi | | G01G 11/003 |
| | | | | 177/145 |
| 8,674,241 B2* | 3/2014 | Klauer | | G01G 15/00 |
| | | | | 177/1 |
| 9,476,757 B2* | 10/2016 | Kleczewski | | G01G 19/035 |
| 2013/0066462 A1* | 3/2013 | Serjeantson | | B65G 43/00 |
| | | | | 700/225 |

\* cited by examiner

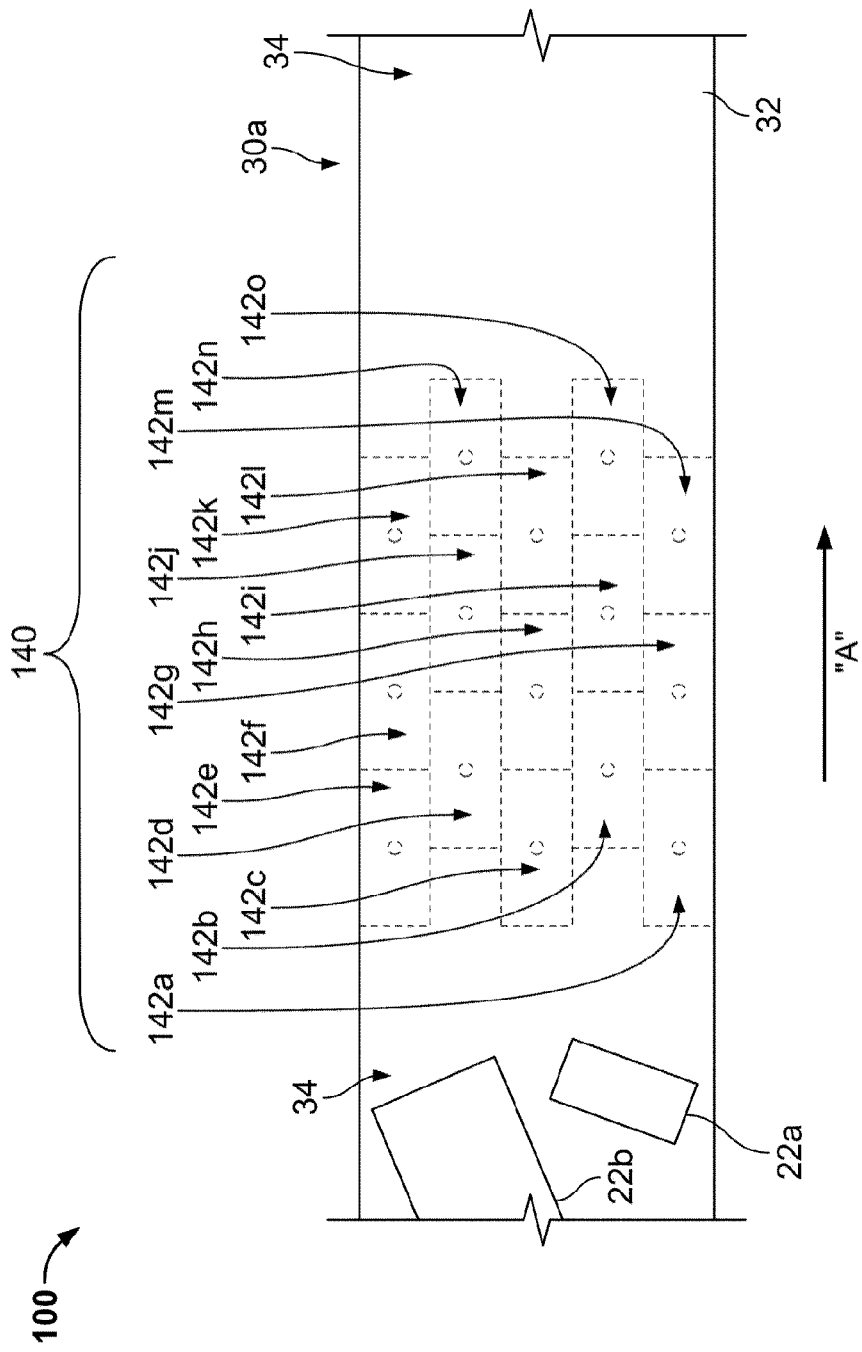

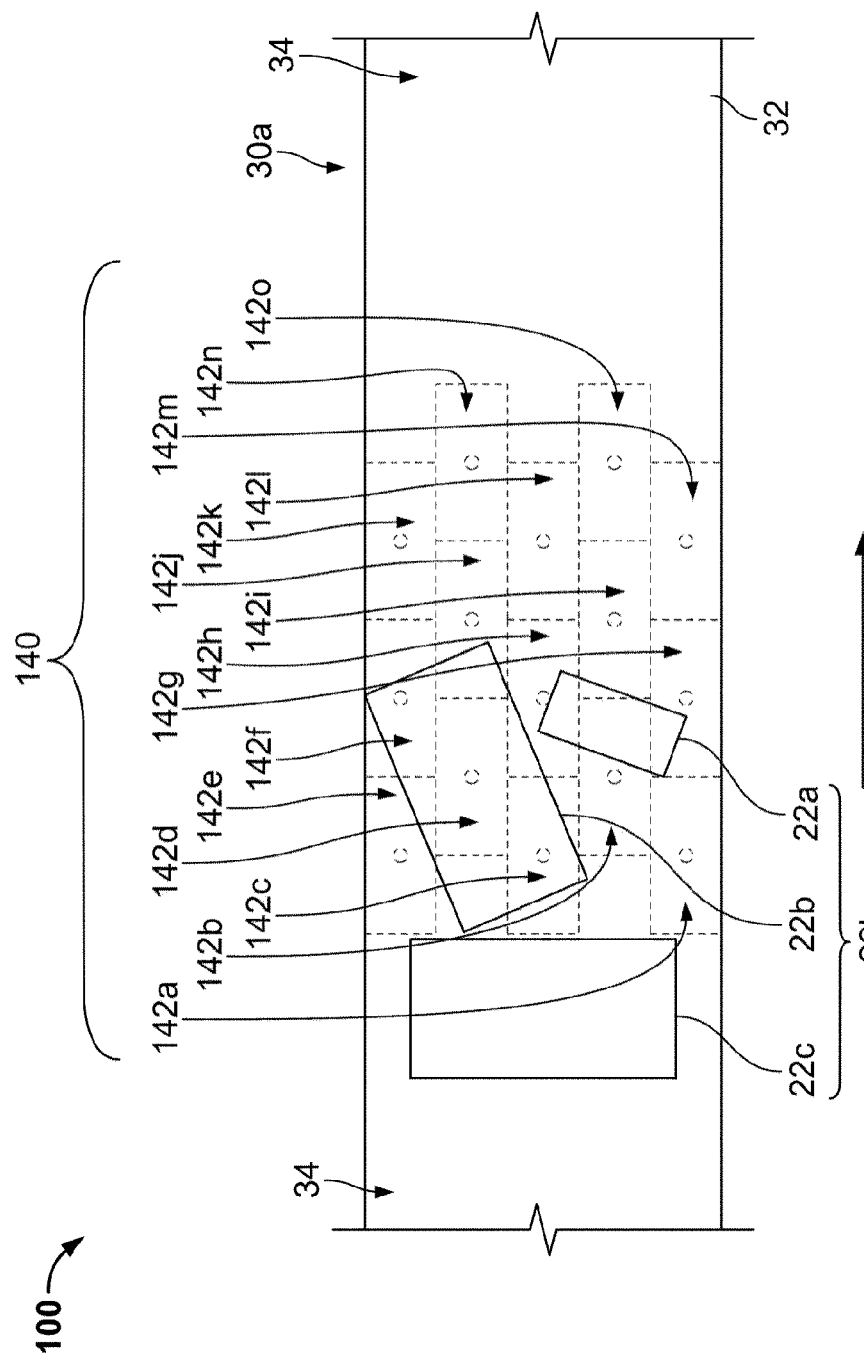

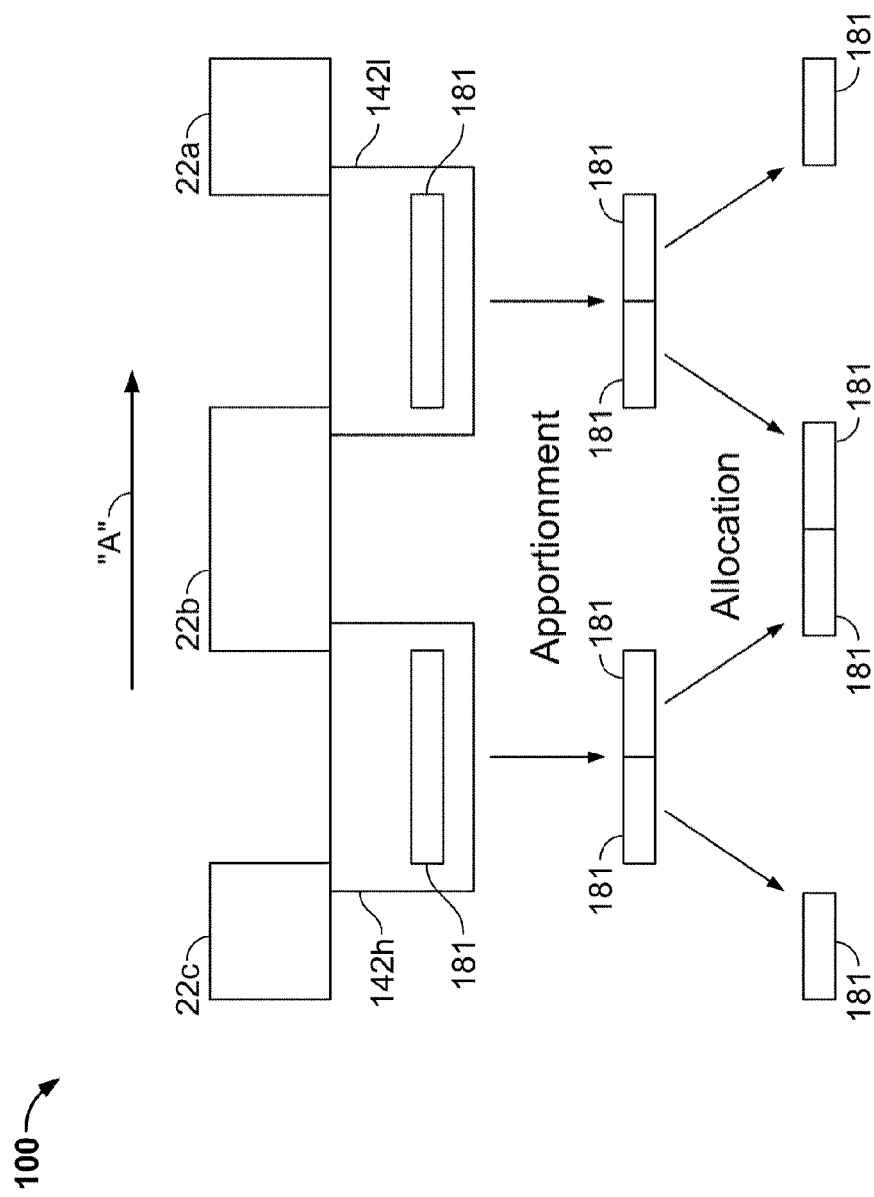

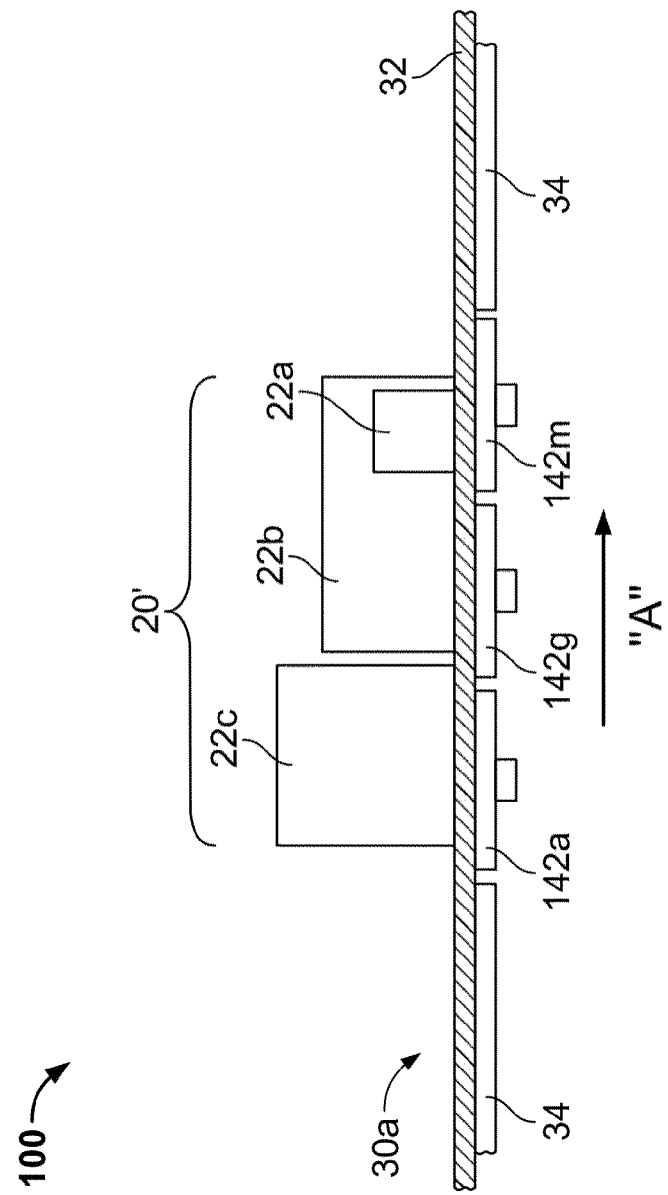

SYSTEM, METHOD, AND COMPUTER READABLE MEDIUM FOR DETERMINING THE WEIGHT OF ITEMS IN NON-SINGULATED AND NON-SPACED ARRANGEMENTS ON A CONVEYOR SYSTEM

FIELD OF THE INVENTION

The present invention relates generally to a weight determining system, method, and computer readable medium, and more particularly to a weight determining system, method, and computer readable medium for use with non-singulated and non-spaced arrangements of items on a conveyor system.

BACKGROUND OF THE INVENTION

In the shipping provider and/or manufacturing industry, weight determining technology may have been used to determine the weights of items on a conveyor for the purpose of revenue recovery. Conveyors (alternately herein referred to as "conveyor systems" and/or "conveying systems") are common pieces of mechanical handling equipment that move materials from one location to another. Many kinds of conveying systems are available, and are used according to the various needs of different industries. Types of conveyor systems, in the prior art, may include (among other things) flexible conveyor systems and heavy duty roller conveyors.

In the prior art, weight determining technology may have included an scale using four load cells arranged at the corners of a solid platform for the determination of item weight. FIGS. 1A and 1B depict plan and side views, respectively, of one such system having a load cell at each corner of the scale wherein the load cells are positioned beneath a conveyor belt. This arrangement of load cells may have calculated item weight by summing and/or averaging the weight determinations from each load cell. Accordingly, this prior art weight determining technology may have only been adapted to determine the weight of a single item, or the average weight of two or more items, at any given time or the weight. In order to determine the weight of a single item, items may have been required to be arranged in a singulated (i.e., single-file or arranged in a single row) and spaced manner (i.e., non-abutting or with sufficient gaps between items so that only one item is on a scale at a given time) with respect to the conveyor's direction of travel. FIG. 2 depicts a plan view of items having a singulated and spaced arrangement.

In a shipping provider and/or manufacturing facility, however, items may, but need not necessarily, be received and/or conveyed in a non-singulated (i.e., not single-file) and/or non-spaced (i.e., abutting of only with very small gaps) arrangement. The non-singulated arrangement may be either with respect to a direction of travel of the conveyor or a direction that is transverse to the direction of travel of the conveyor. FIG. 3 depicts a plan view of items having a non-singulated and non-spaced arrangement. This non-singulated and/or non-spaced arrangement of items may have presented challenges to previous weight determining technology and attempts to determine item weights may not have yielded useful results for items in a non-singulated and/or non-spaced arrangement. For example, prior art weight dimensioning technology may not have been able to distinguish between the respective weights of each of the items in a non-singulated and/or non-spaced arrangement due to the increased likelihood of there being at least two items on the scale at a given time. This may have led to incorrect determination of item weights and/or the production of a weight determining error (e.g., an inability to measure item weight). The need to have a singulated and spaced arrangement may have impaired and/or prevented the ability of a shipping provider, for example, to recover revenue based on the reweighing of items by requiring costly manual intervention and/or additional automation. Shipping provider operations that process a high number of items may have had to sacrifice item weight measurement capability in an effort to achieve targeted clearance times for items. Sacrificing item weight measurement capability may have resulted in a loss of revenue.

As may be appreciated by persons having ordinary skill in the art, shipping providers may, but need not necessarily, base customer charges for delivering an item on the weight of the item. That is to say, shipping providers may apply increasingly greater charges to customer invoices for delivering items having increasingly greater weights. In addition, or alternatively, shipping providers may charge customers a premium to deliver overweight items (i.e., items having a weight that is greater than some threshold value). More specifically, for example, if a shipping provider receives an item for transport that weighs more than the threshold value for which the premium charge may apply, but the customer has declared a weight for the item that is less than the threshold value, then the shipping provider may have difficulty receiving the full payment for shipping the overweight item.

In a disparate, but related, area of prior art, dimension determining technology may have been used to determine the dimensions of items on a conveyor for the purpose of revenue recovery. While previous dimension determining technology may have only been capable of determining individual item dimensions for items in a singulated and spaced arrangement, some of the current dimension determining technology (e.g., CS5200 or CSN210 MassFlow dimensioner offered by Mettler Toledo of Columbus, Ohio) may be capable of determining the dimensions of items in a non-singulated and/or non-spaced arrangement. The ability to determine the dimensions of items in a non-singulated and/or non-spaced arrangement may have provided shipping provider and/or manufacturing operations with the capability of processing increased numbers of items without limiting the collection of item dimension information as, for example, the items do not require sorting (i.e., manipulation to achieve a singulated and spaced arrangement) prior to dimension determination. This may have (i) facilitated revenue recovery and/or (ii) reduced the time required to clear items from a facility towards targeted clearance times for items.

Notably, however, with respect to items having a non-singulated and/or non-spaced arrangement, dimensioning technology in the prior art may have been limited by (i) an inability to determine the dimensions of items with respect to a conveyor (ii) an inability to determine the dimensions of items downstream or upstream with respect to the position of the dimension determining apparatus and/or (iii) an inability to interface with weight determining technology to assign dimensions and a weight to single items.

Due to the inability of prior weight determining technology to determine individual weights of items having a non-singulated and/or non-spaced arrangement, it would not have been obvious to combine the weight determining and dimension determining technologies of the prior art. A combination of the prior art technologies would be impractical as, for example, while dimensions of items in non-singulated and/or non-spaced arrangements could be determined, the items would require manipulation to achieve a singulated and spaced arrangement to facilitate the determination of individual item weights. Instead, any combination of prior art technologies in the prior art may have used the dimensioning apparatus to confirm whether items were in a singulated and spaced arrangement to facilitate accurate item weight determination.

What may be needed is a system, method, device and/or computer readable medium that overcomes one or more of the limitations associated with the prior art. It may be advantageous to provide a system, method, device and/or computer readable medium which facilitates the determination of item weight for items in a non-singulated and/or non-spaced arrangement. The ability to measure individual item weight for items in a non-singulated and/or non-spaced arrangement may help to increase the revenue associated with the conveyed items as (i) there is no requirement for the costly manipulation of items, by manual or automated means, to ensure that the items are have a singulated and/or spaced arrangement; and (ii) the accuracy of customer declared weight for each of the items may be audited.

It may be an object of one aspect of the present invention to determine the weight of an item.

It may be an object of one aspect of the present invention to determine the weight of an individual item included amongst a group of items (i.e., an item in a mass flow environment).

It may be an object of one aspect of the present invention to determine the individual weight for items regardless of their arrangement (i.e., singulated, non-singulated, spaced, and/or non-spaced).

It may also be an object of one aspect of the present invention to physically store, on a computer readable medium, instructions for execution by one or more processors to implement such a system and/or method.

It may be an object of one aspect of the present invention to provide a system, method, device and/or computer readable medium adapted for determining the arrangement of items in a mass flow environment relative to other items.

It may be an object of one aspect of the present invention to provide a system, method, device and/or computer readable medium to facilitate the generation of revenue on an item weight-adjusted basis.

It may be an object of one aspect of the present invention to provide a system, method, device and/or computer readable medium to facilitate the attribution of dimensions and weights for individual items in a singulated, non-singulated, spaced, and/or non-spaced arrangement.

It may be an object of one aspect of the present invention to provide a system, method, device and/or computer readable medium adapted for use in parcel delivery and/or postal applications to facilitate the movement of freight, and/or for use in association with the manufacture of items.

It is an object of the present invention to obviate or mitigate one or more of the aforementioned disadvantages and/or shortcomings associated with the prior art, to provide one of the aforementioned needs or advantages, and/or to achieve one or more of the aforementioned objectives of the invention.

SUMMARY OF THE INVENTION

According to the invention, there is disclosed a weight determining system for use with a singulated, non-singulated, spaced, and/or non-spaced arrangement of items on a conveyor. The system includes an array of load cells, a scanning apparatus, and one or more processors. The array is associated with the conveyor and configured to have each of the items bear upon one or more of the load cells. Each of the load cells is configured to: (i) bear one or more of the items; and (ii) generate load data associated with the aforesaid one or more of the items. The scanning apparatus is configured to generate scan data corresponding to the arrangement of the items on the conveyor. The processors are encoded to: collect the load data and the scan data; and based on the scan data (i) apportion the load data, from the aforesaid each of the load cells, to the aforesaid one or more of the items, (ii) allocate the load data, apportioned as aforesaid, to the aforesaid each of the items from the aforesaid one or more of the load cells, and (iii) determine a weight for the aforesaid each of the items in the arrangement based on the load data apportioned and allocated as aforesaid.

According to an aspect of one preferred embodiment of the invention, the processors are preferably, but not necessarily, further encoded to, based on the scan data: determine when one of the items bears upon two or more of the load cells; and/or then collect and/or allocate the load data, from the aforesaid two or more of the load cells, to the aforesaid one of the items.

According to an aspect of one preferred embodiment of the invention, the processors are preferably, but not necessarily, further encoded to, based on the scan data: determine when one of the load cells bears two or more of the items; and/or then collect and/or apportion the load data, from the aforesaid one of the load cells, to the aforesaid two or more of the items.

According to an aspect of one preferred embodiment of the invention, the system may preferably, but need not necessarily, also include one or more databases to store the load data, the scan data, and/or the weight for the aforesaid each of the items.

According to an aspect of one preferred embodiment of the invention, the scanning apparatus may preferably, but need not necessarily, include a speed determining device configured to determine a speed of the conveyor. Preferably, when the load data is generated at a different time than the scan data, the processors may, but need not necessarily, be further encoded to: generate speed data corresponding to the speed of the conveyor; and/or based on the speed data, apportion and/or allocate the load data as aforesaid.

According to an aspect of one preferred embodiment of the invention, the processors may preferably, but need not necessarily, be further encoded to, based on the scan data and/or the speed data, determine the locations of the items in the arrangement relative to the aforesaid one or more of the load cells of the array.

According to an aspect of one preferred embodiment of the invention, the processors may preferably, but need not necessarily, be further encoded to, based on the locations of the items, determine the aforesaid one or more of the load cells from which the load data is to be collected for the aforesaid each of the items.

According to an aspect of one preferred embodiment of the invention, the scanning apparatus may preferably, but need not necessarily, be further configured to read a unique identification tag associated with the aforesaid each of the items. The processors may preferably, but need not necessarily, be further encoded to associate the unique identification tag with the weight for the aforesaid each of the items.

According to an aspect of one preferred embodiment of the invention, the processors may preferably, but need not necessarily, be further encoded to generate an alert for presentation to a user, preferably when the weight differs from predetermined weight data associated with the unique identification tag.

According to an aspect of one preferred embodiment of the invention, the processors may preferably, but need not necessarily, be further encoded to, based on the scan data, determine dimension data for the aforesaid each of the items.

According to an aspect of one preferred embodiment of the invention, on a plan view of the array, the load cells may preferably, but need not necessarily, be arranged in a brick-like pattern. The load cells may preferably, but need not necessarily, be configured such that, as the conveyer bears the aforesaid each of the items over the array, the load data is allocated to the aforesaid each of the items, as aforesaid, from an increased number of sets of the load cells than would be achieved if, on a plan view of the array, the load cells were arranged in a notional grid-like pattern.

According to an aspect of one preferred embodiment of the invention, as the conveyer bears the aforesaid each of the items over the array, the weight for the aforesaid each of the items may preferably, but need not necessarily, be determined two or more times.

According to an aspect of one preferred embodiment of the invention, the array may preferably, but need not necessarily, be configured, relative to the items, such that the aforesaid each of the items bears upon a first set of the load cells and/or later, as the conveyer bears the aforesaid each of the items over the array, upon a second set of the load cells disjoint from the first set.

According to an aspect of one preferred embodiment of the invention, a size of the aforesaid each of the load cells may preferably, but need not necessarily, be predetermined based on a size of the items.

According to an aspect of one preferred embodiment of the invention, the weight may preferably, but need not necessarily, be used for recovery of costs associated with the items on the conveyer.

According to an aspect of one preferred embodiment of the invention, the load cell may preferably, but need not necessarily, be a roller load cell, a conveyor load cell, or a conveyor belt load cell.

According to the invention, there is also disclosed a weight determining method for use with a singulated, non-singulated, spaced, and/or non-spaced arrangement of items on a conveyor. The method includes step (a), step (b), and step (c). In step (a), each of the items is conveyed to bear upon one or more load cells in an array. Each of the load cells: (i) bears one or more of the items; and (ii) generates load data associated with the aforesaid one or more of the items. In step (b), a scanning apparatus is used to generate scan data corresponding to the arrangement of the items on the conveyor. In step (c), one or more processors are used to: collect the load data and the scan data; and based on the scan data (i) apportion the load data, from the aforesaid each of the load cells, to the aforesaid one or more of the items, (ii) allocate the load data, apportioned as aforesaid, to the aforesaid each of the items from the aforesaid one or more of the load cells, and (iii) determine a weight for the aforesaid each of the items in the arrangement based on the load data apportioned and allocated as aforesaid.

According to an aspect of one preferred embodiment of the invention, in step (c), the processors may preferably, but need not necessarily, be further used to, based on the scan data: determine when one of the items bears upon two or more of the load cells; and/or then collect and/or allocate the load data, from the aforesaid two or more of the load cells, to the aforesaid one of the items.

According to an aspect of one preferred embodiment of the invention, in step (c), the processors may preferably, but need not necessarily, be further used to, based on the scan data: determine when one of the load cells bears two or more of the items; and/or then collect and/or apportion the load data, from the aforesaid one of the load cells, to the aforesaid two or more of the items.

According to an aspect of one preferred embodiment of the invention, the method may preferably, but need not necessarily, also include a step of using one or more databases to store the load data, the scan data, and/or the weight for the aforesaid each of the items.

According to an aspect of one preferred embodiment of the invention, in step (b), a speed determining device of the scanning apparatus may preferably, but need not necessarily, determine a speed of the conveyor. In step (c), preferably when step (a) is performed at a different time than step (b), the processors may preferably, but need not necessarily, be further used to: generate speed data corresponding to the speed of the conveyor; and/or based on the speed data, apportion and/or allocate the load data as aforesaid.

According to an aspect of one preferred embodiment of the invention, in step (c), the processors may preferably, but need not necessarily, be further used to, based on the scan data and the speed data, determine the locations of the items in the arrangement relative to the aforesaid one or more of the load cells of the array.

According to an aspect of one preferred embodiment of the invention, in step (c), the processors may preferably, but need not necessarily, be further used to, based on the locations of the items, determine the aforesaid one or more of the load cells from which the load data is to be collected for the aforesaid each of the items.

According to an aspect of one preferred embodiment of the invention, in step (b), the scanning apparatus may preferably, but need not necessarily, be further used to read a unique identification tag associated with the aforesaid each of the items. In step (c), the processors may preferably, but need not necessarily, be further used to associate the unique identification tag with the weight for the aforesaid each of the items.

According to an aspect of one preferred embodiment of the invention, in step (c), the processors may preferably, but need not necessarily, be further used to generate an alert for presentation to a user, preferably when the weight differs from predetermined weight data associated with the unique identification tag.

According to an aspect of one preferred embodiment of the invention, in step (c), the processors may preferably, but need not necessarily, be further used to, based on the scan data, determine dimension data for the aforesaid each of the items.

According to an aspect of one preferred embodiment of the invention, before steps (a) through (c), the load cells may preferably, but need not necessarily, be arranged, on a plan view of the array, in a brick-like pattern.

According to an aspect of one preferred embodiment of the invention, as the conveyer bears the aforesaid each of the items over the array, the weight for the aforesaid each of the items may preferably, but need not necessarily, be determined two or more times.

According to an aspect of one preferred embodiment of the invention, before steps (a) through (c), the array may preferably, but need not necessarily, be configured, relative to the items, such that the aforesaid each of the items bears upon a first set of the load cells and/or later, as the conveyer bears the aforesaid each of the items over the array, upon a second set of the load cells disjoint from the first set.

According to an aspect of one preferred embodiment of the invention, before steps (a) through (c), a size of the aforesaid each of the load cells may preferably, but need not necessarily, be determined based on a size of the items.

According to an aspect of one preferred embodiment of the invention, the method may preferably, but need not necessarily, also include a step of using the weight for recovery of costs associated with the items on the conveyer.

According to an aspect of one preferred embodiment of the invention, the method may preferably, but need not necessarily, use load cells that include a roller load cell, a conveyor load cell, or a conveyor belt load cell.

According to the invention, there is also disclosed a computer readable medium. The computer readable medium is for use with: a singulated, non-singulated, spaced, and/or non-spaced arrangement of items on a conveyor; an array of load cells associated with the conveyor, with the array configured to have each of the items bear upon one or more of the load cells, and with each of the load cells configured to bear one or more of the items and generate load data associated with the aforesaid one or more of the items; and a scanning apparatus which generates scan data corresponding to the arrangement of the items on the conveyor. The computer readable medium includes executable instructions which are physically stored thereon and which, upon execution, encode one or more processors to: collect the load data and the scan data; and based on the scan data (i) apportion the load data, from the aforesaid each of the load cells, to the aforesaid one or more of the items, (ii) allocate the load data, apportioned as aforesaid, to the aforesaid each of the items from the aforesaid one or more of the load cells, and (iii) determine a weight for the aforesaid each of the items in the arrangement based on the load data apportioned and allocated as aforesaid.

According to an aspect of one preferred embodiment of the invention, the computer readable medium may preferably, but need not necessarily, use load cells that include a roller load cell, a conveyor load cell, or a conveyor belt load cell.

According to the invention, there is also disclosed a load cell having a rolling wheel assembly projecting from a load bearing portion of the load cell. The assembly includes a wheel, a post to rotatably support the wheel, and a wheel assembly support to interface between the post and the load bearing portion of the load cell. When an item engages the wheel, load data is transferred from the item to the load cell.

According to an aspect of one preferred embodiment of the invention, the rolling wheel assembly also includes a motor to actuate the wheel.

According to the invention, there is also disclosed a conveyor belt load cell wherein the conveyor belt is embedded with conveyor belt load cells.

Other advantages, features and characteristics of the present invention, as well as methods of operation and functions of the related elements of the system, method, and computer readable medium, and the combination of steps, parts and economies of manufacture, will become more apparent upon consideration of the following detailed description and the appended claims with reference to the accompanying drawings, the latter of which are briefly described hereinbelow.

BRIEF DESCRIPTION OF THE DRAWINGS

The novel features which are believed to be characteristic of the system, method, device and computer readable medium according to the present invention, as to their structure, organization, use, and method of operation, together with further objectives and advantages thereof, will be better understood from the following drawings in which presently preferred embodiments of the invention will now be illustrated by way of example. It is expressly understood, however, that the drawings are for the purpose of illustration and description only, and are not intended as a definition of the limits of the invention. In the accompanying drawings:

FIG. 7A is a plan view of an array according to one preferred embodiment of the invention;

FIGS. 7B, 7C and 7D are plan views of items having a non-singulated and non-spaced arrangement being conveyed in direction "A" across an array according to one preferred embodiment of the invention;

FIG. 8 is a schematic diagram of load data apportionment and allocation with reference to FIG. 7C according to one preferred embodiment of the invention;

FIG. 9 is a side view of FIG. 7C according to one embodiment of the invention;

DETAILED DESCRIPTION OF THE PREFERRED EMBODIMENTS

Figure 1A:
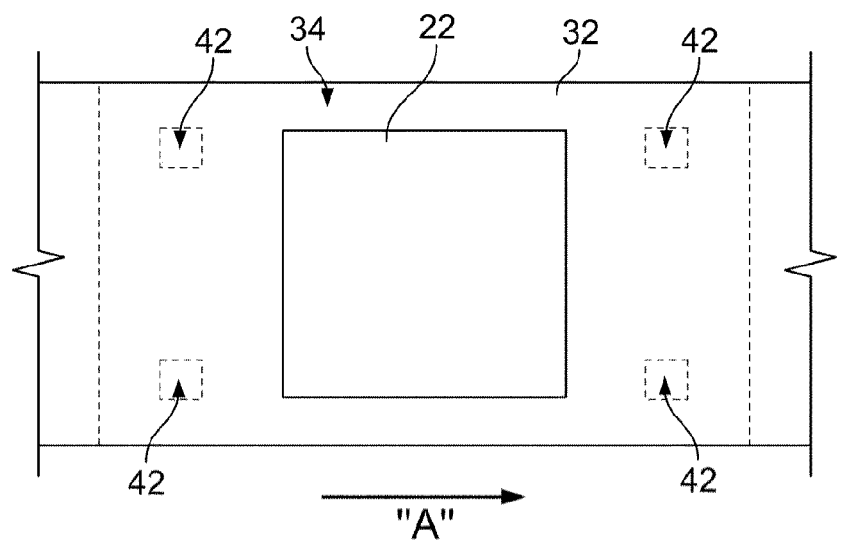
FIGS. 1A and 1B are plan and side views, respectively, of a weight determining system disclosed by the prior art with an item on a conveyor bearing on a scale having a load cell at each corner.
Figure 1B:
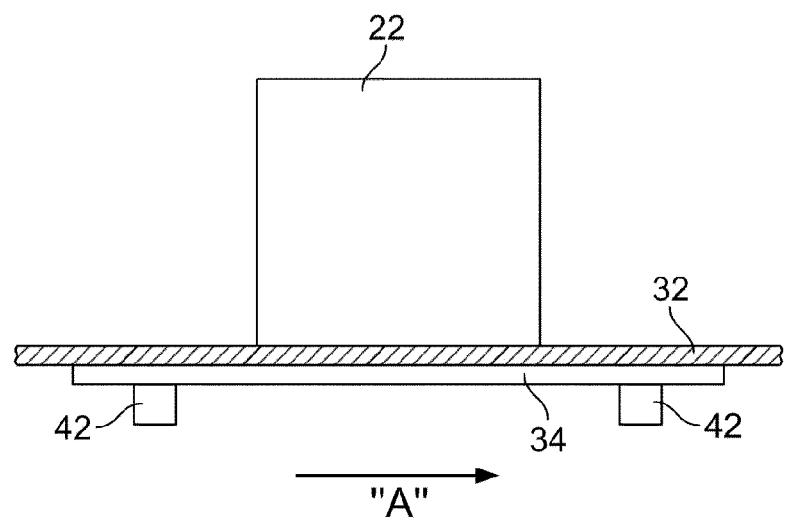

Referring to FIGS. 1A and 1B, there is shown a prior art scale comprising four prior art load cells 42 positioned at the corners of a conveyor bed 34. FIGS. 1A and 1B, the plan and side views respectively, show an item 22 bearing on a conveyor belt 32 as it moves across the bed 34 in downstream direction "A". This arrangement of the prior art load cells 42 may have calculated the weight of the item 22 by summing and/or averaging the weight determinations from each of the prior art load cells 42.

Figure 2:
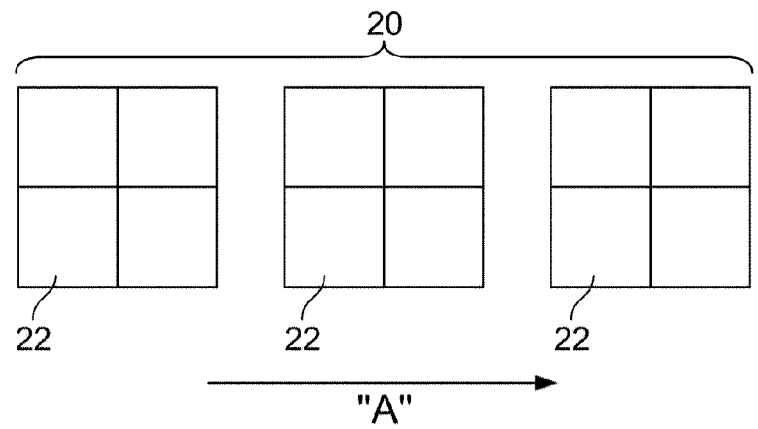
FIG. 2 is a plan view of items having a singulated and spaced arrangement relative to a direction "A"

Referring to FIG. 2, there is depicted an example of items 22 (alternately, herein, "packages" or "parcels") moving in downstream direction "A" having a singulated and spaced arrangement 20.

Figure 3:
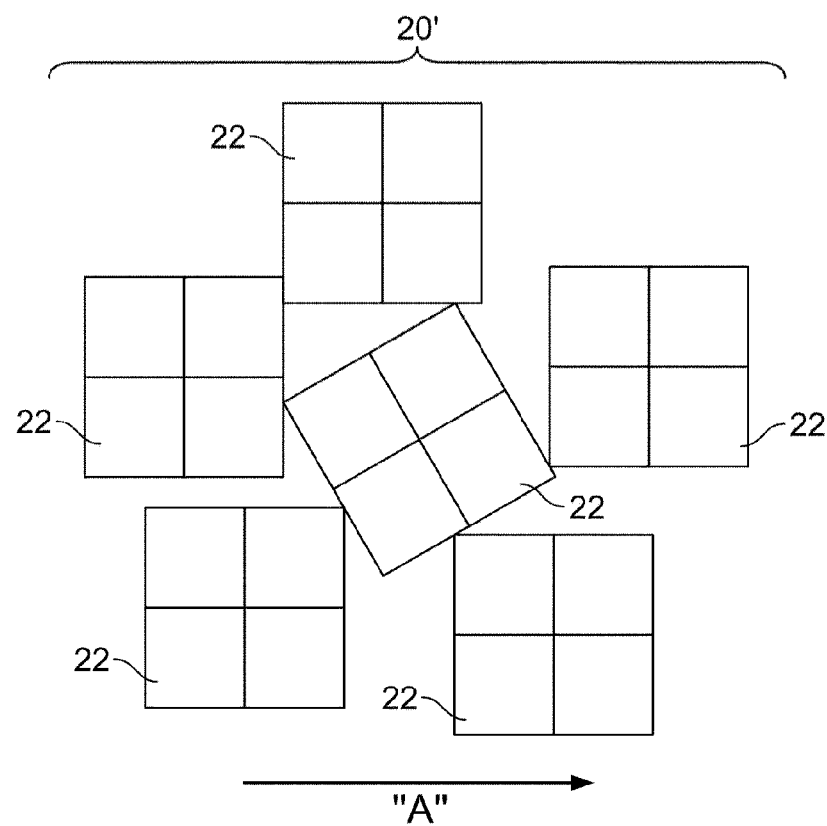
FIG. 3 is a plan view of items having a non-singulated and non-spaced arrangement relative to a direction "A"
Figure 4:
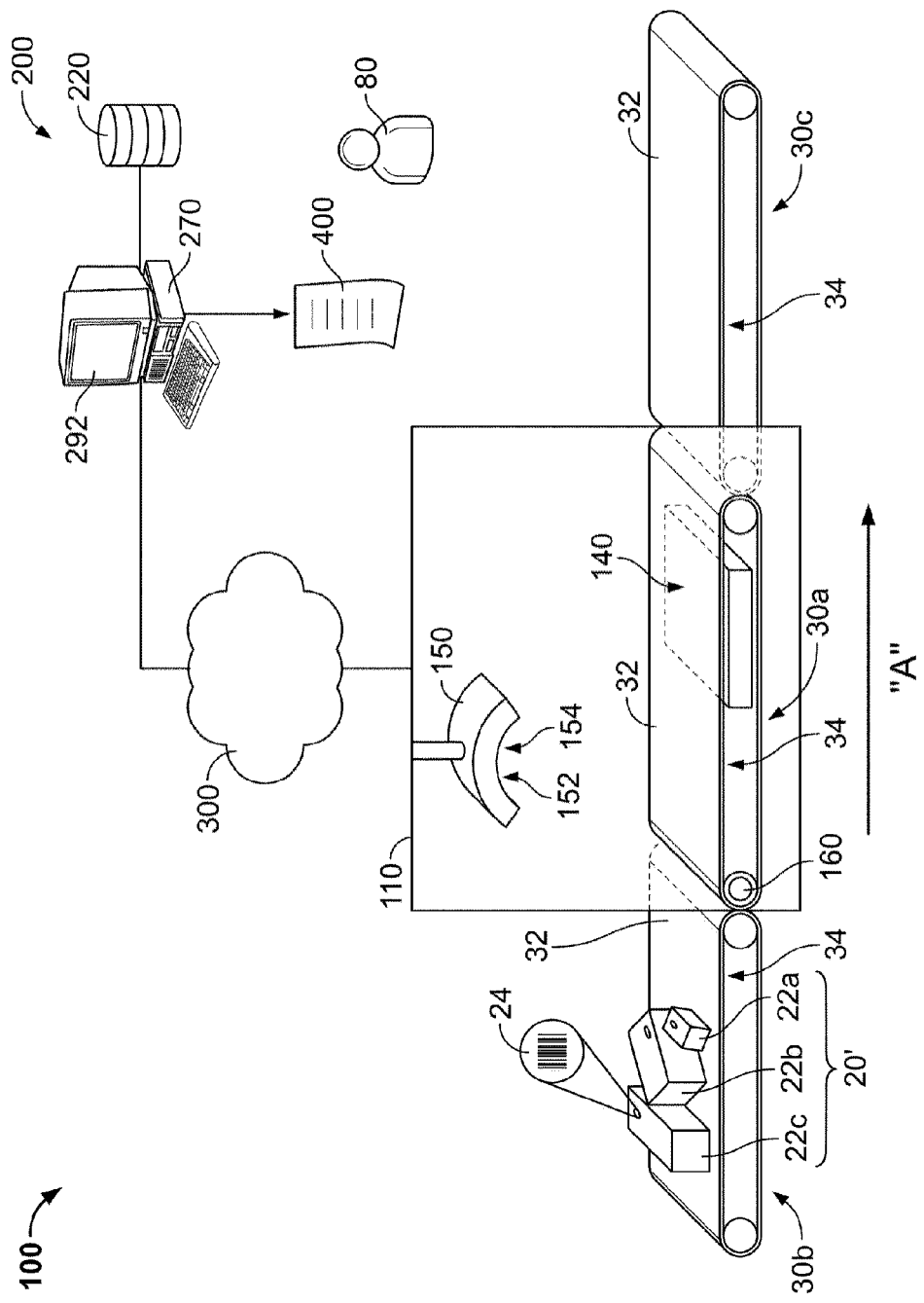
FIG. 4 is a schematic diagram of a weight determining system for use with singulated, non-singulated, spaced, and/or non-spaced arrangements of items on a conveyor according to one preferred embodiment of the invention.

Referring to FIG. 3, there is depicted an example of items 22 (generally) moving in downstream direction "A" having a non-singulated and non-spaced arrangement 20' (also depicted in FIGS. 4, 7, and 8).

Referring to FIG. 4, there is shown a system 100 for determining the weight of items 22 (generally) on a conveyor 30a having a singulated, non-singulated, spaced and/or non-spaced arrangement. The system 100 may be used within a single facility and/or multiple facilities. For example, some of the components of the system 100 may be provided at a remote location.

Each of items 22a, 22b, 22c shown in FIG. 4 has a unique identification tag 24, preferably a barcode, affixed thereto. Items 22a, 22b, 22c, having the non-singulated and non-spaced arrangement 20', are transported in downstream direction "A" by a series of conveyors 30a, 30b, 30c and preferably constitute freight or other items moving within a mail system, a distribution system generally, or a manufacturing facility. Each of the conveyors 30a, 30b, 30c preferably includes the conveyor bed 34 to support the items 22 (generally) and the conveyor belt 32 to facilitate transit of the items 22 (generally).

Figure 5:
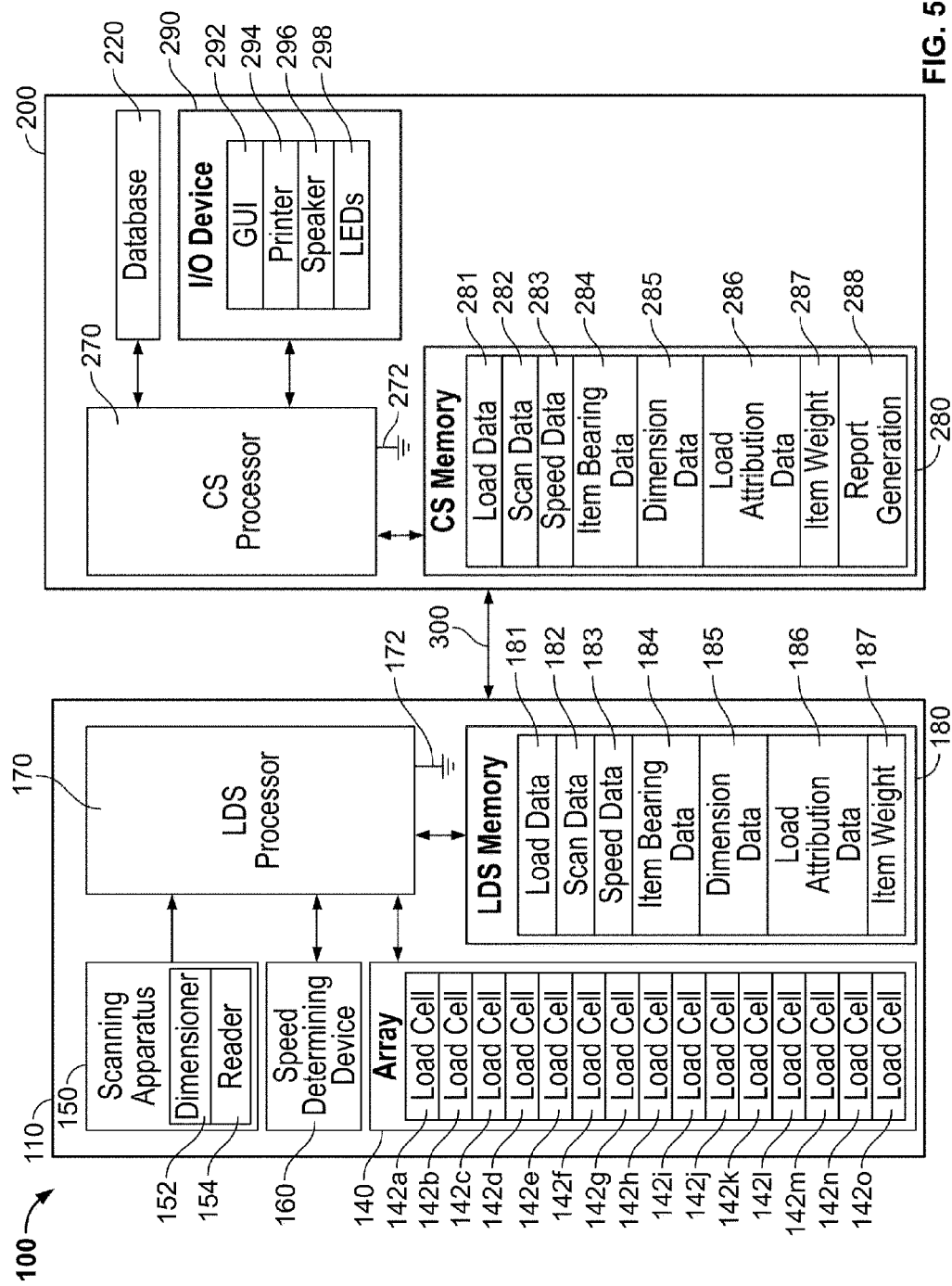
FIG. 5 is a schematic diagram of components of the system of FIG. 4.

Preferably, and as best seen in FIGS. 4 and 5, the system 100 includes a load determining subsystem (alternately, the "LDS") 110 and a courier subsystem (alternately, the "CS") 200.

The load determining subsystem 110, as depicted in FIGS. 4 and 5, preferably includes a scanning apparatus 150 and an array 140. The scanning apparatus 150 preferably comprises a dimensioner 152 for determining the dimensions of each of the items 22 (generally) on the conveyor 30a and a reader 154 to automatically read and/or determine the location of the unique identification tags 24 from the items 22 (generally). The reader 154 is preferably a barcode scanner, but can be an imager, or a laser-based reader. [The reader 154 may instead be a radio-frequency identification ("RFID") reader. When an RFID reader is provided, one or more of the identification tags 24 on the items 22 (generally) are RFID tags.] In preferable embodiments, as shown in FIGS. 4 and 5, the load determining subsystem 110 may comprise a speed determining device 160.

As further shown in FIGS. 4 and 5, the system 100 is adapted for use with a communication network 300. The communication network 300 may include satellite networks, terrestrial wired or wireless networks, and the Internet. The communication of data between the load determining subsystem 110 and the courier subsystem 200 may be also achieved via physical means (e.g., a flash drive) of transmission. Persons having ordinary skill in the art will appreciate that the system 100 includes hardware and software.

The courier subsystem 200 preferably comprises a CS processor 270, a graphical user interface ("GUI") 292, and a database 220. As may be best appreciated by a consideration of FIGS. 4 and 5, the database 220 is preferably included within the courier subsystem 200 and located remotely from the load determining subsystem 110. Reports 400 (e.g., invoices) generated by the CS processor 270 may be viewed by a user 80 via the GUI 292.

Referring to FIG. 5, there is schematically illustrated, among other things, the load determining subsystem 110 that includes the scanning apparatus 150 (including the dimensioner 152 and the reader 154), the array 140 comprising a plurality of load cells 142a-o, an LDS processor 170, and a computer readable medium 180 (e.g., an onboard LDS processor-readable memory). In preferable embodiments (also shown in FIG. 4), the load determining subsystem 110 may comprise the speed determining device 160. The courier subsystem 200 includes the CS processor 270, the database 220, and a computer readable medium 280 (e.g., a CS processor-readable memory). The courier subsystem 200 is shown to further include various input-output (alternately "I/O") devices 290 such as the GUI 292, a printer 294, a speaker 296, and light emitting diodes (alternately "LEDs") 298 associated with the courier subsystem 200.

The GUI 292 may include a touchscreen (and the two terms may be used interchangeably herein), a display with or without a "point-and-click" mouse or other input device. The GUI 292 enables (selective or automatic) display of any data (as described below) determined by the processors 170, 270—whether received directly therefrom and/or retrieved from the database 220—as well as display and input, of other information associated with the items 22 (generally).

Preferably, the processors 170, 270 are operatively encoded with one or more algorithms 181, 182, 183, 184, 185, 186, 187, 281, 282, 283, 284, 285, 286, 287, and/or 288 (shown schematically in FIG. 5 as being stored in the LDS memory 180 or the CS memory 280 associated with the load determining subsystem 110 or the courier subsystem 200 respectively) which provide the processors 170, 270 with load data logic 181, 281, scan data logic 182, 282, speed data logic 183, 283, item bearing data logic 184, 284, dimension data logic 185, 285, load attribution data logic 186, 286, item weight logic 187, 287, and/or report generation logic 288. Preferably, the algorithms 181, 182, 183, 184, 185, 186, 187, 281, 282, 283, 284, 285, 286, 287, and/or 288 enable the processors 170, 270 to determine the arrangement of the items 22 (generally) borne by the conveyor 30a, and ultimately the weight of each of the items 22 (generally) borne thereby. The LDS processor 170 and/or the CS processor 270 are also preferably operatively connected to one or more power sources 172, 272.

Using the communication network 300, the LDS processor 170 may be wired to communicate, or may wirelessly communicate (for example, by the Bluetooth™ proprietary open wireless technology standard which is managed by the Bluetooth Special Interest Group of Kirkland, Wash.) with the CS processor 270.

Figure 6:
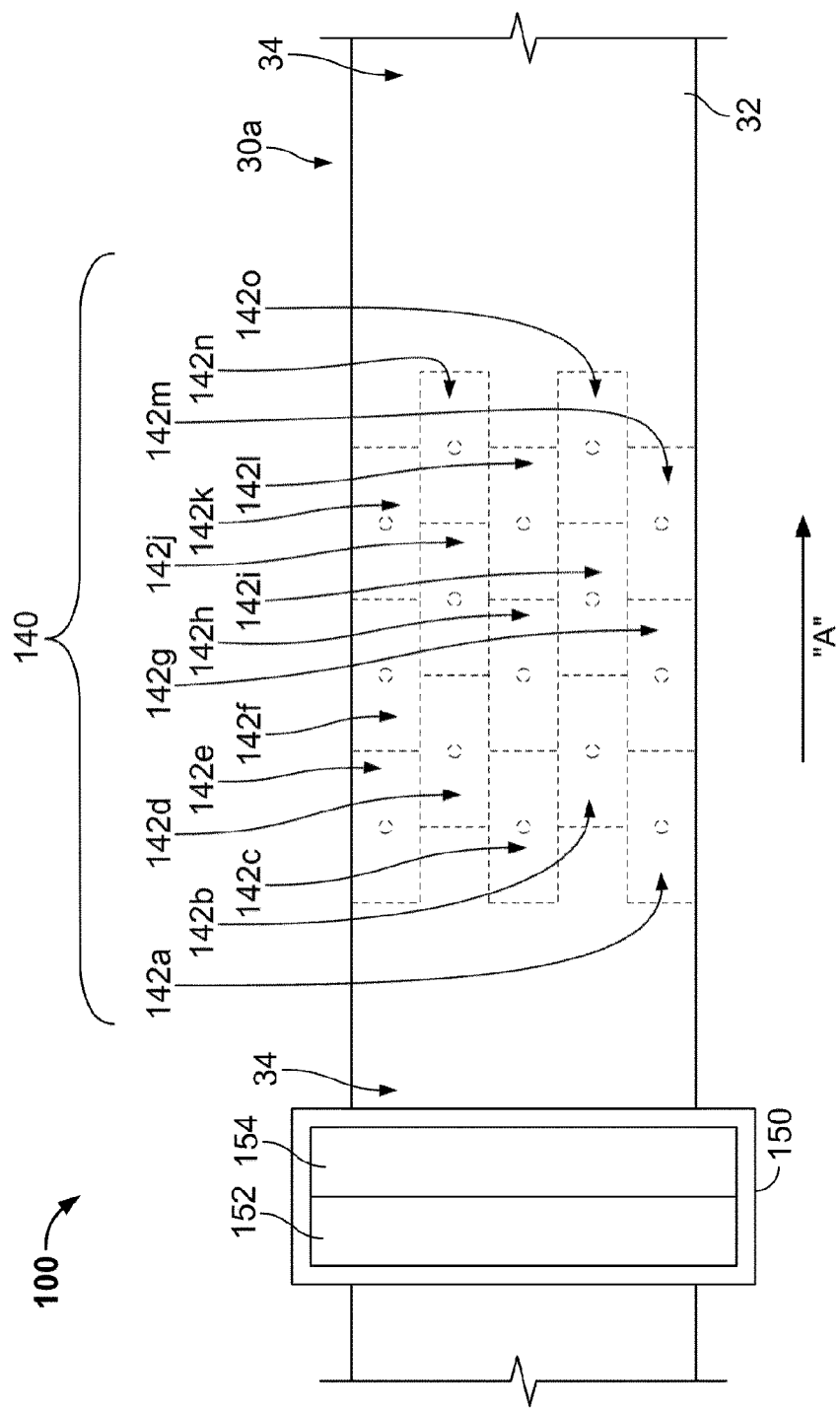
FIG. 6 is a plan view of an item handling subsystem according to one preferred embodiment of the invention.

Referring to FIG. 6, the array 140 may be positioned downstream (with reference to the downstream direction "A") from the scanning apparatus 150 (including the dimensioner 152 and the reader 154) and within the conveyor 30a. In an alternate embodiment (not shown), the array 140 may be positioned in substantial vertical alignment with the scanning apparatus 150.

In a preferred embodiment of the invention, the scan data 182, 282 and/or the dimension data 185, 285 may be used to track the items 22 (generally) as they move in a downstream direction "A" along the conveyor 30a. Preferably, the items 22 (generally) may be tracked for a distance of up to about twelve (12) feet in the downstream direction A relative to the position of the scanning apparatus 150 in order to accommodate arrays 140 of various sizes and to allow for the substantially concurrent generation of scan data 182, 282 and load data 181, 282 for the items 22 (generally).

As best seen in FIG. 6 (also shown in FIG. 7), the array 140 preferably includes load cells 142a, 142b, 142c, 142d, 142e, 142f, 142g, 142h, 142i, 142j, 142k, 142l, 142m, 142n, 142o arranged in a brick-like pattern (i.e., as opposed to a grid-like pattern, each of the load cells 142a-o are offset in the downstream direction "A" relative to one of the other load cells 142*a-o* that is laterally adjacent). The conveyor 30*a* is also shown to comprise the conveyor belt 32 and conveyor bed 34.

Referring to FIGS. 7A-D, there is shown the array 140 comprising load cells 142*a*, 142*b*, 142*c*, 142*d*, 142*e*, 142*f*, 142*g*, 142*h*, 142*i*, 142*j*, 142*k*, 142*l*, 142*m*, 142*n*, 142*o* arranged in the brick-like pattern. Items 22*a*, 22*b*, 22*c*, having the non-singulated and non-spaced arrangement 20' and bearing on the conveyor belt 32 and conveyor bed 34, transit in downstream direction "A" by the conveyor 30*a*.

Figure 7C:
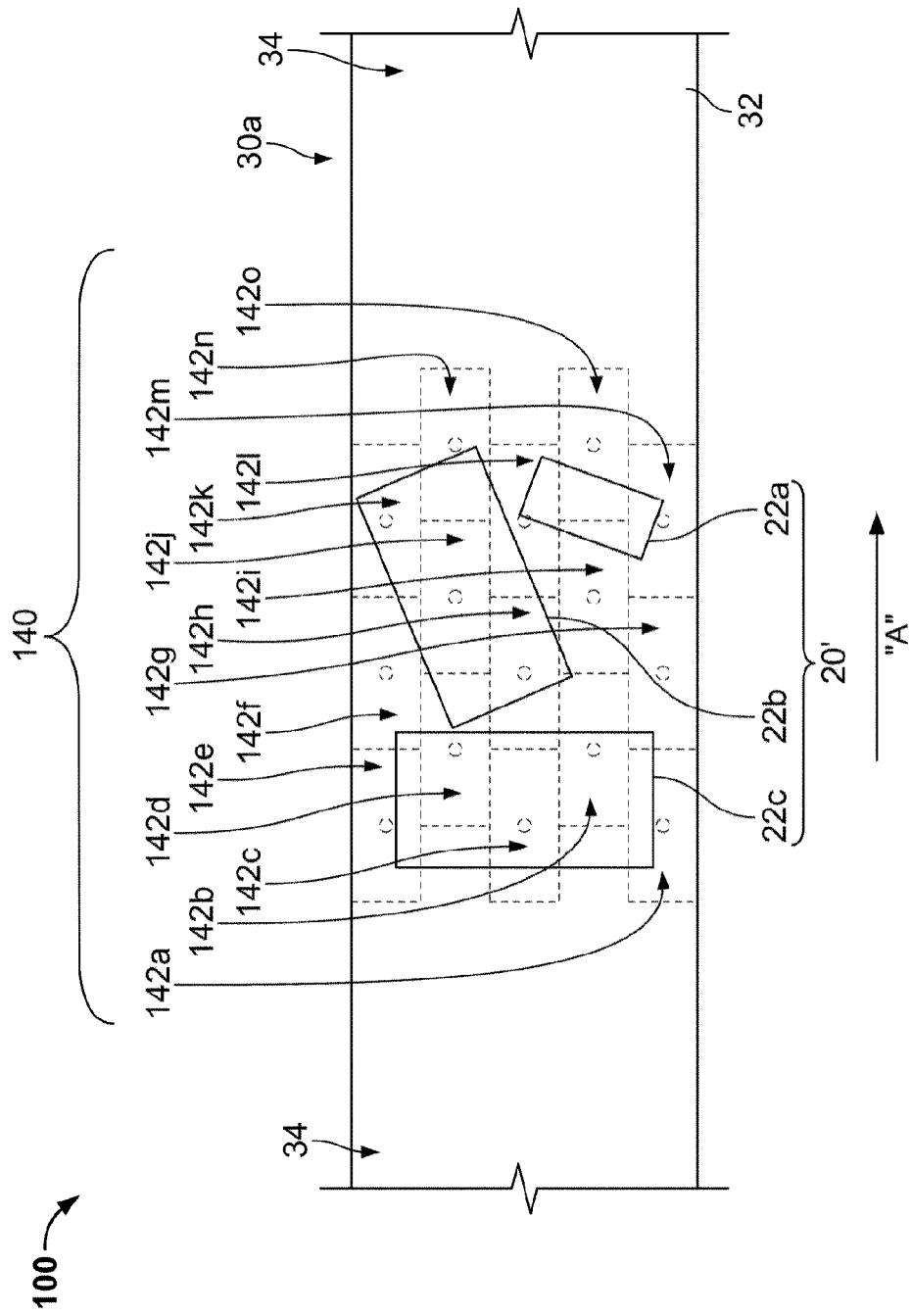

In FIG. 8, items 22*a*, 22*b*, 22*c* are shown moving in the downstream direction "A" over load cells 142*l*, 142*h* (as depicted in FIG. 7C). Item 22*a* is shown bearing upon load cell 142*l*, item 22*b* is shown bearing upon load cells 142*l*, 142*h*, and item 22*c* is shown bearing upon load cell 142*h*. Load cell data 181 from load cell 142*l* is shown apportioned into load cell data 181, 181 and as between items 22*a*, 22*b*. Load cell data 181 from load cell 142*h* is shown apportioned into load cell data 181, 181 and as between items 22*b*, 22*c*. Load cell data 181 from load cell 142*l* is allocated to item 22*a*. Load cell data 181, 181 from load cells 142*l* and 142*h* is allocated to item 22*b*. Load cell data 181 from load cell 142*h* is allocated to item 22*c*.

Referring to FIG. 9, there is shown a side view of FIG. 7C, where items 22*a*, 22*b*, 22*c*, having the non-singulated and non-spaced arrangement 20' and bearing on the conveyor belt 32, the conveyor bed 34 and load cells 142*a-o* (only load cells 142*a*, 142*g*, 142*m* are shown in this view) transit in downstream direction "A" by the conveyor 30*a*. As best seen in present FIG. 9, each of the load cells 142*a-o* may preferably have a gap between itself and the adjacent load cells 142*a-o*. The gap may preferably be of any size which permits substantially accurate weight measurements.

In use, as best shown in FIGS. 4 and 5, items 22 (generally) are received by the conveyor 30*a* of the load determining subsystem 110. The scanning apparatus 150 preferably generates scan data 182, 282 comprising information concerning the arrangement of the items 22 (i.e., singulated, non-singulated, spaced, and/or non-spaced) on the conveyor 30*a*. In FIG. 4, items 22*a*, 22*b*, 22*c* having the non-singulated and non-spaced arrangement 20'. The arrangement of the items 22 (generally) may preferably be determined to a level of accuracy within about ⅛ of an inch. The scanning apparatus 150 preferably comprises the dimensioner 152 for collecting dimension data 185, 285 (e.g., x-coordinate [alternately width], y-coordinate [alternately length], and/or z-coordinate [alternately height] in relation to the conveyor 30*a*), which may be based on the scan data 182, 282, for each of the items 22 (generally) on the conveyor 30*a*. The scanning apparatus 150 also preferably comprises the reader 154 adapted to read or scan information (e.g., a barcode) from each of the items 22 (generally), which may subsequently be associated with one of the corresponding items 22 by the processors 170, 270. In some preferred embodiments according to the invention, the processors 170, 270 may also use the dimension data 185, 285 to facilitate the determination of the center of each of the items 22 (generally).

Substantially concurrently with the generation of scan data 182, 282 by the scanning apparatus 150, the load cells 142*a-o* of the array 140 generate load data 181, 281 comprising information concerning the load associated with each of the items 22 (generally) on the conveyor 30*a*. Scan data 182, 282 and load data 181, 281 are collected by the processors 170, 270.

As best depicted in FIG. 6, the array 140 is comprised of load cells 142*a-o* in the brick-like pattern. Each of the load cells 142*a-o*, alone or in combination with one or more of the other load cells 142*a-o*, preferably collects load data 181, 281 associated with one or more of the items 22 (generally) bearing on the load cells 142*a-o* as the items 22 (generally) are conveyed across the array 140.

Persons of skill in the art will appreciate that load cells 142*a-o* arranged in the brick-like pattern, relative to a notional grid-like pattern, is configured such that the load data 181, 281 generated by each of the load cells 142*a-o* may be allocated to each of the items 22 (as discussed in greater detail below) from an increased number of sets of the load cells 142*a-o* as the conveyor bears each of the items 22 (generally) over the array 140. In other words, as compared to load cells 142*a-o* having the grid-like pattern, load cells 142*a-o* having the brick-like pattern encourages the staged transit of the items 22 (generally) over the array 140 to maximize the number of opportunities for each of the items 22 (generally) to be associated with load data 181, 281 generated by different combinations of load cells 142*a-o*. An increase in the number of sets of load cells 142*a-o* that bear each of the items 22 (generally), preferably results in more accurate determinations of item weight 187, 287.

The determination of item weight 187, 287 by the system 100, for items 22 (generally) having the non-singulated and non-spaced arrangement 20', is best depicted by reference to FIGS. 7A-D. In FIGS. 7A-D, items 22*a*, 22*b*, 22*c* travel in the downstream direction "A" towards the array 140 having load cells 142*a*, 142*b*, 142*c*, 142*d*, 142*e*, 142*f*, 142*g*, 142*h*, 142*i*, 142*j*, 142*k*, 142*l*, 142*m*, 142*n*, 142*o* arranged in the brick-like pattern. As shown in FIG. 7A, as items 22*a*, 22*b* (22*c* not shown) approach the array 140, the conveyor bed 34 is bearing the load associated with each of items 22*a*, 22*b* (22*c* not shown) and consequently, no load data 181, 281 for items 22*a*, 22*b*, 22*c* is generated by the load cells 142*a-o*.

As shown in FIG. 7B, items 22*a*, 22*b*, 22*c* have now advanced further in the downstream direction "A". At least a portion of item 22*a* is now bearing on load cells 142*b*, 142*g*, 142*h*, and 142*i*. At least a portion of item 22*b* is bearing on load cells 142*c*, 142*d*, 142*e*, 142*f*, 142*h*, and 142*j*. Item 22*c* has not yet advanced to the array 140 and is still bearing on the conveyor bed 34.

As shown in FIG. 7C, items 22*a*, 22*b*, 22*c* have moved further along the conveyor 30*a* in the downstream direction "A". At least a portion of item 22*a* is now bearing on load cells 142*i*, 142*l*, 142*m*, and 142*o*. At least a portion of item 22*b* is now bearing on load cells 142*b*, 142*d*, 142*f*, 142*h*, 142*i*, 142*j*, 142*k*, 142*l*, and 142*n*. Item 22*c* is now only partially bearing on the conveyor bed 34, but has also advanced so that it has reached the array 140 and at least a portion of item 22*c* is now bearing on load cells 142*a*, 142*b*, 142*c*, 142*d*, 142*e*, 142*f*, 142*g*, and 142*h*. Notably, the combinations of load cells 142*a-o* bearing items 22*a*, 22*b* in FIG. 7C differs from the combinations of load cells 142*a-o* bearing items 22*a*, 22*b* in FIG. 7B.

Figure 7D:
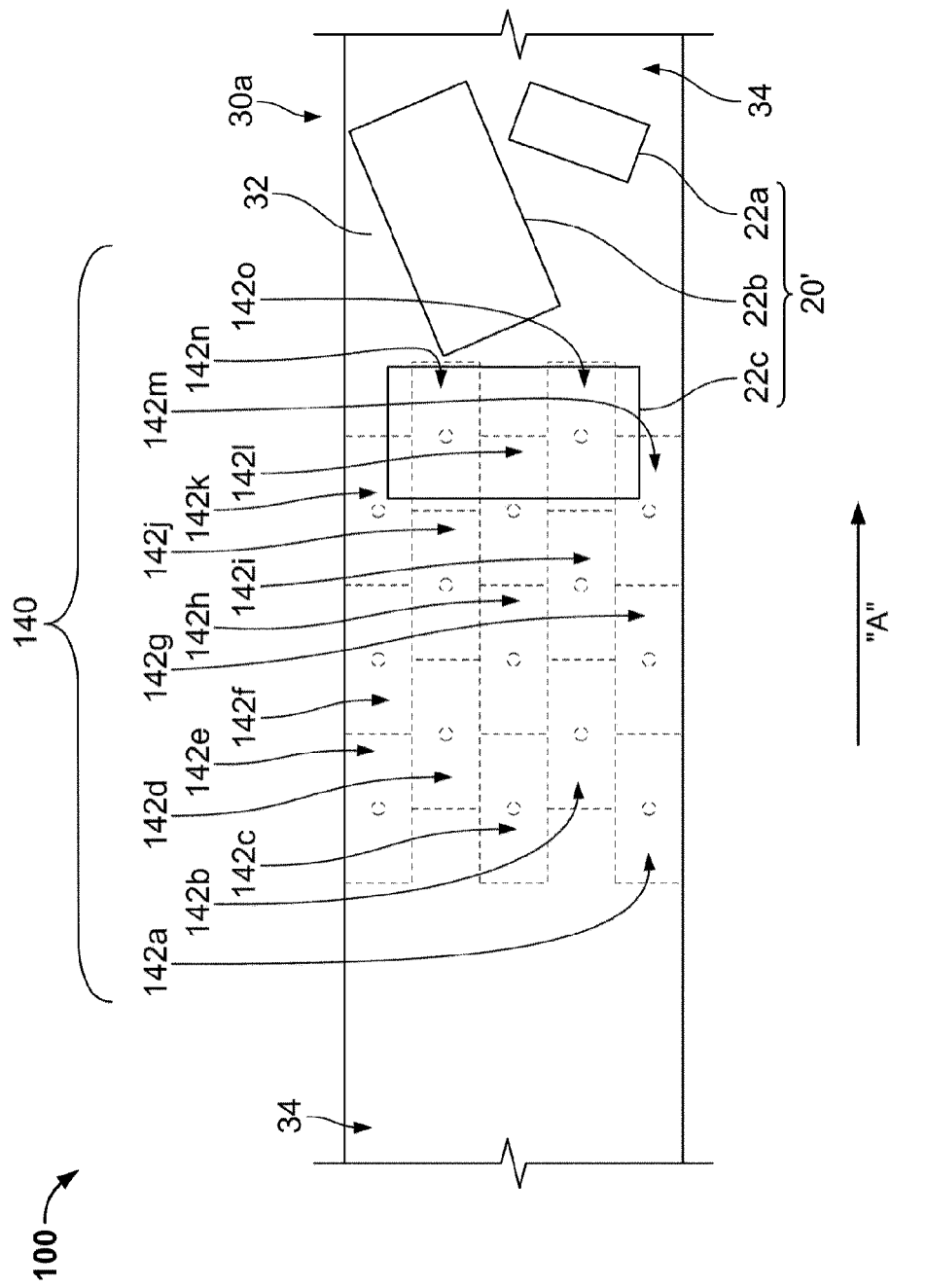

As shown in FIG. 7D, items 22*a*, 22*b*, 22*c* have advanced further along the conveyor 30*a* in the downstream direction "A". Items 22*a* and 22*b* are no longer bearing on the load cells 142*a-o* comprising the array 140. At least a portion of item 22*c*, however, is bearing on load cells 142*k*, 142*l*, 142*m*, 142*n*, and 142*o* in addition to the conveyor bed 34. Notably, the combination of load cells 142*a-o* bearing item 22*c* in FIG. 7D differs from the combination of load cells 142*a-o* bearing item 22*c* in FIG. 7C.

As each of items 22 (generally) transit over the array 140, the load associated with the portion of each of items 22 (generally) bearing on each of the load cells 142*a-o* may be collected and recorded as load data 181, 281. Given the brick-like configuration of the load cells 142a-o, items 22a, 22b, 22c bear on varying combinations of load cells 142a-o at various moments in time (represented by FIGS. 7A-D). Load data 181, 281 associated with each of items 22a, 22b, 22c is repeatedly generated as each of items 22a, 22b, 22c passes over the varying combination of load cells 142a-o.

Load data 181, 281 generated by each of the load cells 142a-o is preferably apportioned and allocated by the processors 170, 270 (with reference to the scan data 182, 282) to one or more of items 22a, 22b, 22c. For example, with reference to FIG. 7B, in determining the load data 181, 281 attributable to item 22a, load cells 142b, 142g, 142h, and 142i are canvassed. Since at least a portion of items 22a and 22b are bearing on load cell 142h, at least a portion of the load data 181, 281 generated by load cell 142h is apportioned to item 22a with the remainder apportioned to item 22b. As item 22a is the only item 22 (generally) bearing on load cells 142b, 142g and 142i, the entire portion of the load data 181, 281 generated by load cells 142b, 142g and 142i is apportioned to item 22a. The load data 181, 281 generated by load cells 142b, 142g, 142h, and 142i and apportioned to item 22a are subsequently allocated, or integrated, into load attribution data 186, 286 for the item 22a. In the same way, the load attribution data 186, 286 for items 22b, 22c may be determined.

As items 22a, 22b, 22c transit across the array 140, varying combinations of load cells may bear the load associated with each of items 22a, 22b, 22c. For example, with reference to FIG. 7C, in determining a second set of load data 181, 281 attributable to item 22a, load cells 142i, 142l, 142m, and 142o are canvassed. Since at least a portion of items 22a and 22b are bearing on load cells 142i and 142l, at least a portion of the load data 181, 281 generated by load cells 142i and 142l is apportioned to item 22a with the remainder apportioned to item 22b. As item 22a is the only item 22 (generally) bearing on load cells 142m and 142o, the entire portion of the load data 181, 281 generated by load cells 142m and 142o is apportioned to item 22a. The load data 181, 281 generated by load cells 142i, 142l, 142m, and 142n and apportioned to item 22a are subsequently allocated, or integrated, into load attribution data 186, 286 for item 22a. In the same way, a second set of load attribution data 186, 286 for items 22b, 22c may also be determined.

Therefore, the processors 170, 270 preferably determine item weight 187, 287 using (e.g., by averaging) the sets of load attribution data 186, 286 for each of items 22a, 22b, 22c.

As shown in FIG. 9, the gap between each of the load cells 142a-o comprising the array 140 preferably facilitates downstream weight determination of the items 22 (generally) by the processors 170, 270 by, for example, avoiding false generation of load data 181, 281 due to contact between the load cells 142a-o.

The processors 170, 270 may use the scan data 182, 282 collected by the scanning apparatus 150 to determine the approximate path of each of the items 22 (i.e., item tracking) as they pass along the array 140. The items 22 (generally) are preferably tracked by the scanning apparatus 150 prior to moving onto the array 140 and/or during transit of the items 22 (generally) over the array 140. Tracking the items 22 (generally) preferably allows the processors 170, 270 to use the scan data 182, 282 obtained by the scanning apparatus 150 (e.g., the x-coordinates, the y-coordinates, and/or the z-coordinates) for each of the items 22 (generally) to determine the combination of load cells 142a-o having a high probability of relating to each of the items 22 (generally). Substantially accurate weighing of items 22 (generally) in a mass flow environment may be attainable by tracking the locations of the items 22 (generally) and/or determining the relative probability that a given load cell 142a-o may generate load data 181, 281 related to a particular item 22. In addition, the amount of time that each of the items 22 (generally) bears on specific combinations of load cells 140a-o may also be used by the processors 170, 270 to facilitate the determination of item weight 187, 287.

Persons skilled in the art may appreciate that the conveyor belt 32 is malleable, such that items 22 (generally) bearing on any one of the load cells 142a-o may exert a sufficient load to deform the belt 32 to such an extent that the items 22 (generally) cause the belt 32 to bear on adjacent load cells 142a-o even though none of the items 22 (generally) themselves are bearing on those load cells 142a-o. For example, in FIG. 7D, item 22c bears on load cells 142k, 142l, 142m, 142n, and 142o. Depending on the malleability of the belt 32, item 22c may exert a sufficient load to deform the belt 32 such that the belt 32 bears on the load cell 142j resulting in the generation of load data 181, 281. This generation of load data 181, 281 (i.e., by load cells 142a-o not bearing the items 22) may lead to inaccurate determinations of item weight 187, 287.

Preferably, the conveyor belt 32 is of sufficient malleability so that each of the items 22 (generally) only bears substantially exclusively on the one or more load cells 142a-o bearing the load of each of the items 22 (generally) at a given time. In addition, the processors 170, 270 may also determine the times at which each of the items 22 (generally) is advantageously positioned so that the combination of load cells 142a-o canvassed for the load data 181, 281 does not include the load data 181, 281 generated by the load exerted by the belt 32 (i.e., the "zone of accuracy"). Preferably, the processors 170, 270 may use the scan data 182, 282, the load data 181, 281 and/or the dimension data 185, 285 to identify the zones of accuracy for each of the items 22 (generally) in order to obtain more accurate determinations of item weight 187, 287. The processors 170, 270 may also calculate the least accurate combinations of load cells 142a-o for each of the items 22 (i.e., those including load data 181, 281 generated due to a load exerted by the belt 32) to determine inconsistencies in item weight 187, 287. This may facilitate better understanding of the distribution of load data 181, 281 on the load cells 142a-o from the various items 22 (generally) in transit across the array 140.

In another embodiment of the invention, the system 100 may generate the load data 181, 281 and the scan data 182, 282 for the items 22 (generally) at different times. In such an embodiment, the load determining subsystem 110 further comprises the speed determining device 160 (as shown in FIGS. 4 and 5; alternately the "tachometer") to generate speed data 183, 283 which corresponds to a speed of the conveyor 30a and, by extension, a speed at which each of the items 22 (generally) travels along the conveyor 30a. Speed data 183, 283 may therefore be used by the processors 170, 270 to estimate the locations of each of the items 22 (generally) on the conveyor 30a at various points in time relative to the scanning apparatus 150 and/or one or more of the load cells 142a-o. For example, the speed data 183, 283 associated with the conveyor 30a may allow for the determination of the approximate locations of each of the items 22 (generally) on the array 140 at a given time and therefore the combination of load cells 142a-o that any one of the items 22 (generally) is bearing on at that given time. Thus, once the scanning apparatus 150 collects the scan data 182, 282, the speed data 183, 283 may be used to estimate the locations of the items 22 (and the combination of load cells 142*a-o* bearing each of the items 22) as each of the items 22 (generally) passes over the array 140. The combination of scan data 182, 282 and speed data 183, 283 to determine the locations of each of the items 22 (generally), may comprise item bearing data 184, 284.

In some embodiments, the processors 170, 270 may also use the dimension data 185, 285 to determine the locations of each of the items 22 (generally) on the conveyor 30*a* and/or when each of the items 22 (generally) bears upon one or more of the load cells 142*a-o*.

The processors 170, 270 preferably generate a signal for presentation of the various data 181, 182, 183, 184, 185, 186, 187, 281, 282, 283, 284, 285, 286, and 287 to the courier and/or the user 80 of the system 100. The data 181, 182, 183, 184, 185, 186, 187, 281, 282, 283, 284, 285, 286, and 287 may be presented by the system 100 using the GUI 292 associated with the courier subsystem processor 270. As shown in FIG. 4, the data 181, 182, 183, 184, 185, 186, 187, 281, 282, 283, 284, 285, 286, and 287 may be presented using one or more reports 400 generated by the CS processor 280 using an algorithm encoding CS report generation 288.

The I/O device 290 (e.g., GUI 290, printer 294) may be used for generating reports 400. Among others, the following reports 400 may be generated based upon the data 181, 182, 183, 184, 185, 186, 187, 281, 282, 283, 284, 285, 286, and 287: weight reports; invoice reports; dimension reports.

The GUI 292 may display the data 181, 182, 183, 184, 185, 186, 187, 281, 282, 283, 284, 285, 286, and 287 and/or various alerts. Such alerts may include visual (or audible) warning signals which may be triggered to highlight a given condition to the user 80, for example, if a difference identified between a predetermined weight data (which may be associated with the unique identification tag 24) and the determined weight 187, 287 of that item.

The density of the array 140 (i.e., number of load cells 142*a-o* and/or the area of each of the load cells 142*a-o*) is preferably predetermined based on a size of the items 22 (generally) intended to be weighed. For example, if the items 22 (generally) the user 80 would like to capture has average dimensions of 12"×12"×12", the array 140 may be up to four times (e.g., two times as dense in the 'x' dimension, and two times in the 'y' dimension) as dense as the system 100 that is designed to capture items 22 that average dimensions of 24"×24"×24". Since items 22 (generally) may be variable in size and/or shape, the density of the load cells 142*a-o* comprising the array 140 are preferably sized to achieve accurate item weights 187, 287 associated with the highest revenue recovery (i.e., based on the size of the items 22 (generally) that generates the most revenue).

In a preferred embodiment, the items 22 (generally) bear upon a first set of load cells 142*a-o* and subsequently, as the items 22 (generally) transit in the downstream direction "A", the items 22 (generally) bear upon a second set of load cells 142*a-o* that are disjoint (i.e., the first set of load cells 142*a-o* does not include load cells 142*a-o* comprising the second set). In other words, the array 140 is preferably about two-times the length of items 22 (i.e., the y-coordinate) having the greatest length. This relationship may facilitate multiple load data 181, 281 collection for each of the items 22 (generally) from the load cells 142*a-o*. In an alternate embodiment, in situations where it may not be cost-effective to weigh items 22 (generally) having a length that is greater than a threshold length, the array 140 may be about two-times the length of the average length of the items 22 (generally).

In an alternate embodiment (not shown), the scanning apparatus 150 may be integral with the conveyor belt 32. In such an embodiment, the scanning apparatus 150 may facilitate accurate determination of the scan data 182, 282 and the dimension data 185, 285 in order to identify the combination of load cells 142*a-o* that may be used to determine the load attribution data 186, 286 as the items 22 (generally) travel over the array 140.

In another embodiment, the processors 170, 270 may determine situations where the array 140 cannot accurately collect load data 181, 281. For example, these situations may include the following: (i) items 22 (generally) may be too close together for the individual load cells 142*a-o* comprising the load cell array 140 to distinguish between them; (ii) items 22 (generally) may be too light or too heavy in weight for the array 140; and/or (iii) items 22 (generally) may be too large in size for the array 140. In these instances, the processors 170, 270 may not be able to determine the item weight 187, 287.

In another embodiment of the present invention, the item weight 187, 287 may be inserted into a data string in addition to dimension data 185, 285 and/or the unique identification tag 24.

The present system 100 is preferably for use with a revenue stream (e.g., cost recovery of revenue generated through the auditing of item weight) which compares a customer's declared package weight (i.e., predetermined weight data) on a customer package manifest against a second package weight measurement (i.e., item weight 187, 287) and invoices the customer based on the higher package weight.

The database 220 includes, and is regularly updated with, the load data 181, 281, the scan data 182, 282, the speed data 183, 283, the item bearing data 184, 284, the dimension data 185, 285, the load attribution data 186, 286, and the item weight 187, 287. The system 100 may include other databases, such as, for example, a load determining subsystem database (not shown).

The database 220 includes information associated with each of the items 22 (generally) such as the following information: user entered data (e.g., predetermined weight data), destination information, special handling information, and/or special instruction information. Destination information may be the address information of the intended receiver for the items 22 (generally). Special handling information may include any surcharges for conveying oversized, overweight and/or oddly shaped items 22 (generally). Special instruction information may include any specific delivery instructions of the items 22 (generally) for the courier (e.g., direction information and/or expedited, express or priority delivery requests).

All or part of the database 220 may be located behind a firewall relative to the communications networks 300. Persons having ordinary skill in the art will appreciate that references herein to the database 220 may include, as appropriate, references to: (i) a single database located at a facility (e.g., in association with a courier subsystem); and/or (ii) one or more congruent and/or distributed databases, such as, for example, also including one or more sets of congruently inter-related databases—possibly distributed across multiple facilities.

The computer readable medium 180, 280, shown in FIG. 5, stores executable instructions which, upon execution, determines the weight of items 22 (generally), the dimensions of items 22, and generates reports 400. The executable instructions include processor instructions 181, 182, 183, 184, 185, 186, 187, 281, 282, 283, 284, 285, 286, 287, 288 for the processors to, according to the invention, perform the aforesaid method and perform steps and provide functionality as otherwise described above and elsewhere herein.

Roller Load Cells

Figure 10A:
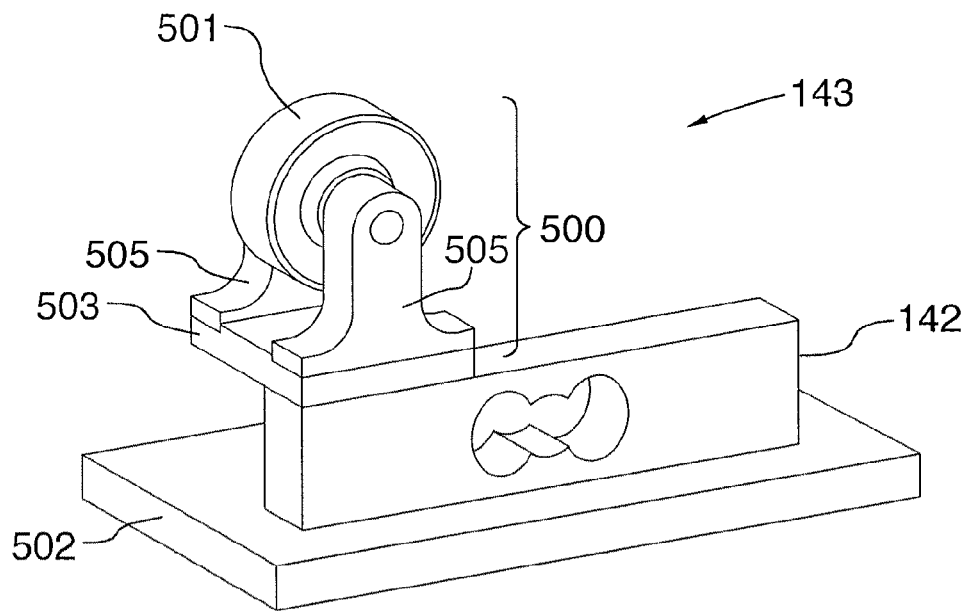
FIGS. 10A and 10B are perspective and side views of a load cell according to one embodiment of the invention.
Figure 10B:
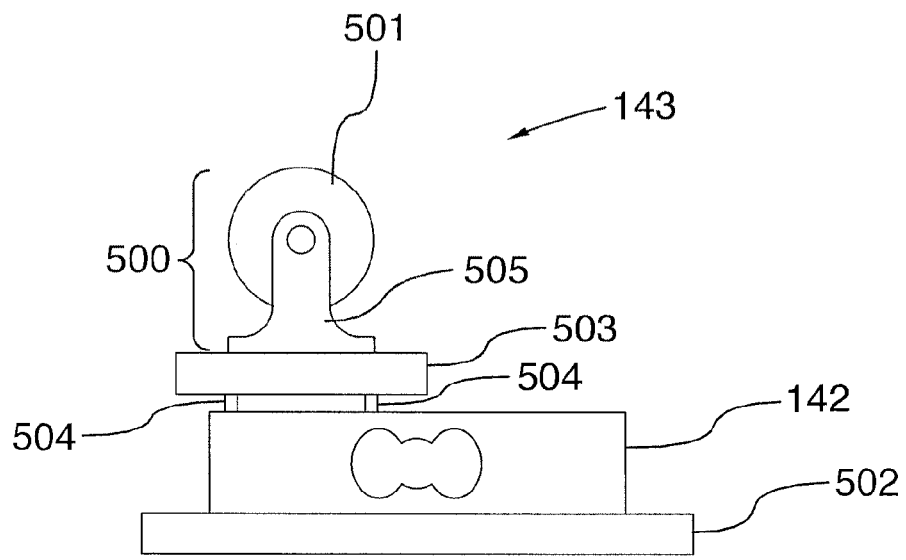

In yet a further embodiment, array 140 may have a series of load cells that provide for the movement of items rather than a conveyor belt as provided in other embodiments. In this embodiment, conveyor belt 32, or a portion thereof, may be replaced with a system of movable or rolling load cells, over which items 22a-c may pass over. As shown in FIGS. 10A and 10B, such a load cell 142 of the present invention may comprise a rolling wheel assembly 500 projecting from a first or loading end of the load cell 142 to form a roller load cell 143. In one embodiment, the rolling wheel assembly 500 may be passive such that the roller load cell 143 remains static as items move across the array. The assembly 500 preferably comprises a rolling element (or wheel) 501 supported by one or more posts 505. As before, the scanning apparatus preferably generates scan data 182, 282 (as shown in FIG. 5) comprising information concerning the arrangement of the items (i.e., singulated, non-singulated, spaced, and/or non-spaced) on the conveyor to facilitate determination of item weight 187, 287 (as shown in FIG. 5).

Figure 11:
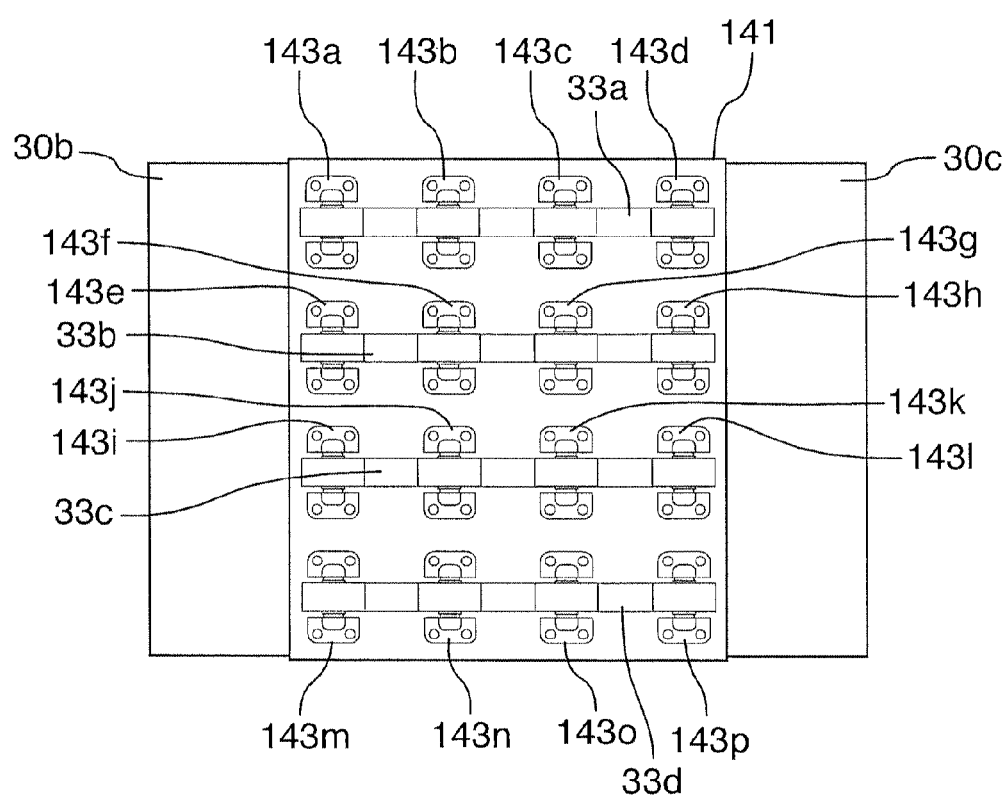
FIG. 11 is a plan view of an array with a plurality of load cells according to one embodiment of the invention.
Figure 12A:
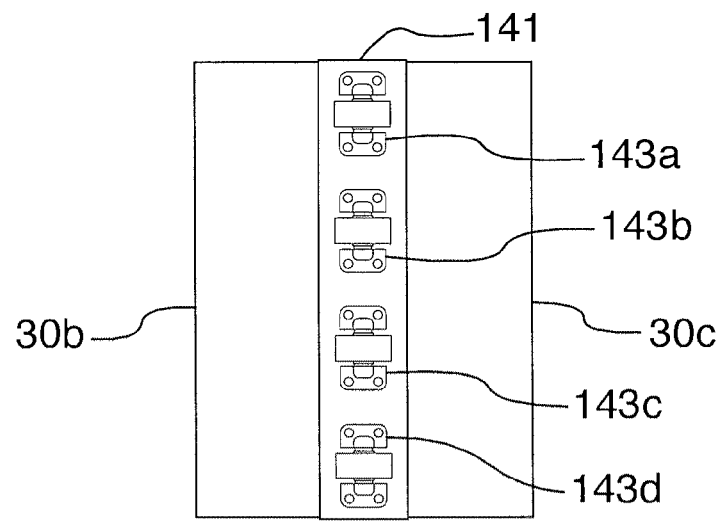
FIGS. 12A and 12B are plan and side views of an array with load cells according to another embodiment of the invention.
Figure 12B:
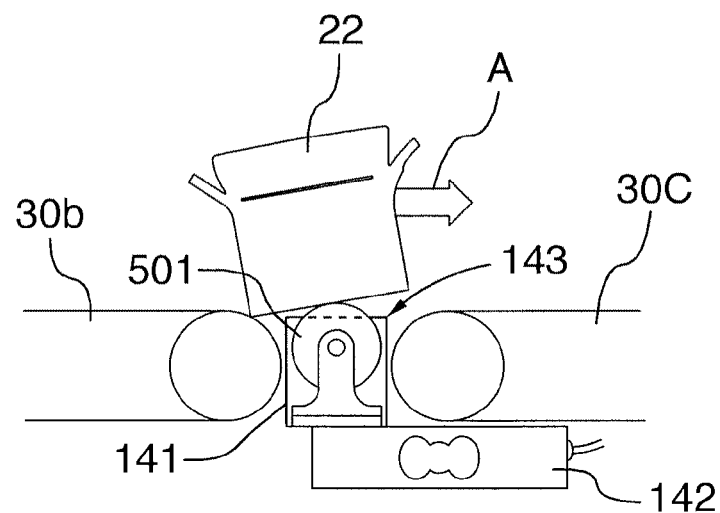

In one embodiment of the invention, as shown in FIG. 11, the array 141 positioned between conveyors 30b,c, preferably includes roller load cells 143a, 143b, 143c, 143d, 143e, 143f, 143g, 143h, 143i, 143j, 143k, 143l, 143m, 143n, 143o, 143p which may be arranged in a grid or brick-like pattern. Preferably, such pattern is sufficient to allow items 22a-c to transition across array 141 while producing the necessary load data for the determination of item weight in accordance with the present invention. It will also be understood that not all of the roller load cells 143a-p need to be functional in that they provide the necessary load data. In a preferred embodiment, roller load cells 143a-p may be weight determining, but it is not necessary that all roller load cells 143a-p do so. As shown in FIG. 11, one embodiment of the array 141 comprises roller load cell belts 33a, 33b, 33c, 33d. Such belts 33a-d may facilitate the transport of items across the array 141 by providing a surface with a high coefficient of friction (i.e., a description of the ratio of the force of friction between the items and the belts 33a-d). In alternate embodiments of the invention, the array 141 does not comprise roller load cell belts 33a-d (not shown). In another embodiment of the array 141, as shown in FIG. 12A, the roller load cells 143a-d are arranged in a row between the conveyors 30b,c. FIG. 12B depicts a side view of the array 141 of FIG. 12A with an item 22 moving in direction "A".

In some embodiments, the items move across the array by positioning the array at an incline (e.g., about 23.5 degrees; not shown) or by adapting one or more of the rolling wheel assemblies 500 (as depicted in FIGS. 10A and 10B) to actuate or drive the items using a motor (or other methods known to persons skilled in the art) to turn the rolling element 501.

In preferable embodiments, roller load cells 143a-p may be adapted for dynamic weighing applications, such as strain gauge-based load cells (e.g., Scaime AG series single point load cells, Phidgets CZL635 model load cells, or similar models known to persons skilled in the art as may be provided by Hottinger Baldwin Messtechnik GmbH (Germany), Loadstar Sensors (California), FUTEK Advanced Sensor Technology, Inc. (California), and Ricelake Weighing Systems (Wisconsin)). Controllers are operatively associated with the load cells (e.g., eNod3-C controller, cRIO controller, etc.) and preferably adapted to accept load data 181, 282 for the items (as shown in FIG. 5) from up to four roller load cells 143. Preferably, the controllers include programmable digital filters to facilitate high speed collection of load data.

In a preferable embodiment, as shown in FIGS. 10A and 10B, the roller load cell 143 may be attached to a base 502. A wheel assembly support 503 is affixed (e.g., bolts) to each load cell with spacers 504 (e.g., nuts) to form a gap between the wheel assembly support 503 and the load cell 142. A rolling wheel assembly 500 projects from each wheel assembly support 503 to facilitate the transfer of force from the rolling element 501 to the load cell 142 through the spacers 504 on the loading end of the load cell 142 for more accurate collection of load data 181, 282.

Figure 13:
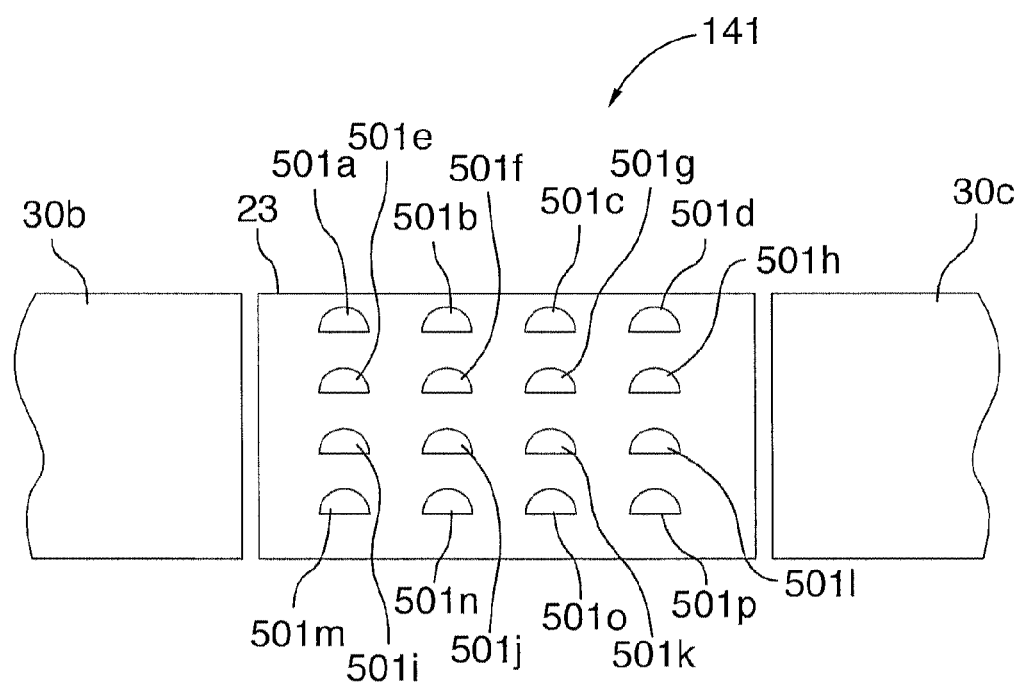
FIG. 13 is a schematic diagram of the system comprising the array of FIG. 11.

In another embodiment of the present invention, as shown in FIG. 13, an item support surface 23 may be positioned above the roller load cells 143a-p (not shown) to provide a surface to support the items as they travel across the roller load cells 143a-p placed between the conveyors 30b,c. Preferably, the support surface 23 defines openings to facilitate contact between the items moving across the array 141 and the rolling elements 501a, 501b, 501c, 501d, 501e, 501f, 501g, 501h, 501i, 501j, 501k, 501l, 501m, 501n, 501o, 501p. The support surface 23 is preferably configured such that when an item is in contact with one of the rolling elements 501a-p, the portion of the item in contact with the wheels 501a-p is not in contact with the surface 23. In this way, an accurate measurement of the load data associated with items may be obtained as the item load will be borne by the rolling element 501a-p instead of the surface 23. Persons skilled in the art will understand that a variety of types of wheels 501 may be used in the roller load cells 143a-p depending on the desired setup and application.

In one embodiment of the present invention, the item support surface 23 has a low coefficient of friction (i.e., a description of the ratio of the force of friction between the items and the support surface 23) to facilitate item sliding across the array 141. Examples could include any material with a low coefficient of friction; preferably a UHMW (Ultra High Molecular Weight Polyethylene) and PTFE Sheet (PolyTetraFlouroEthylene), or any number of plastics or metals with anti-friction coatings containing $MoS_2$ (molybdenum disulfide), graphite, PTFE lubricating solids or Teflon®.

Roller load cells 143a-p are preferably calibrated by a theoretical or physical calibration method preferably using a software interface (e.g., eNodView offered by Scaime, Inc. or LabView offered by National Instruments, Quebec, Canada). The theoretical method preferably involves inputting the load sensitivity and load capacity of the roller load cells 143a-p into the software interface. The physical method preferably involves using the array 141 to measure one or more items having a known load (or weight) and inputting the corresponding expected load data for each of the items having the known load into the interface. In some preferable embodiments, three items having known loads are used in the physical calibration. For both the theoretical and physical methods, the array 141 is configured to have a reading of zero (i.e., no load) when there are no items bearing thereupon.

In preferable embodiments, the load data 181, 282 from each individual roller load cell 143a-p is configured and/or analyzed using serial communication (i.e., process of sending data one bit at a time, sequentially, over a communication channel or computer bus). Preferably, a controller area network (e.g., CAN bus) is used to monitor the network of controllers and load cells 143a-p in real-time.

Measurement Frequency

Preferably, a plurality of measurements (e.g., 50) for the load data of the items 22a-c are measured and analyzed as they pass over the array 141. The frequency of measurements for the load data is preferably adjusted to minimize load data error. In preferable embodiments, the measurement frequency is from 5.5 Hz (or 5.5 measurements of load data per second) to 12 Hz (or 12 measurements of load data per second) for conveyor speeds between 0.2 m/s and 0.5 m/s.

Mechanical Noise

Persons skilled in the art may understand that, in the prior art, mechanical noise is a challenge for obtaining accurate in-motion load data measurements. In some embodiments of the present invention, the source of the mechanical noise includes: (a) resonance of the roller load cell; (b) eccentric rotation of the rolling wheel assembly; and (c) vibration of the base.

For the resonance of the roller load cell, as may be known by persons skilled in the art, strain gauge-based load cells preferably use a flexible cantilever beam to facilitate beam deflection. The cantilever beam is a mass-spring system with minimal damping and may therefore be susceptible to impactive loads. In embodiments of the present invention, a significant portion of the mechanical noise has been found to occur at a frequency range of about 10 to 15 Hz, which is associated with the resonance of the cantilever beam of the load cell.

For the eccentric rotation of the rolling wheel assembly, the rolling element in the assembly typically comprises eccentricity (i.e., the mass center of the rolling element is not the same as its geometric center). This may be related to either the original eccentricity of the rolling element or from the clearance of the bore and the shaft. Persons skilled in the art will understand that eccentric rotation of the rolling wheel assembly will cause some mechanical noise (which will be synchronized with the rotation speed).

For the vibration of the base, as items move across the array, impactive forces are applied to the base and the wheel assembly support. In at least some embodiments, vibration of the base causes additional mechanical vibration.

Sensory Data Processing

In preferable embodiments, load data is processed to take into account mechanical noise generation. In some embodiments, load data processing includes: (a) timing of load data measurement(s); (b) filtering of load data; and (c) exploration of data redundancy (e.g., increasing the number of measurement points for load data).

The time for measuring the load data of an item is preferably at the point that the load data measured by a first rolling element reaches zero. This timing will preferably ensure that the item is wholly supported by the array 141 when the load data for the item is obtained. In addition, the timing of the measurement depends on many different factors such as the configuration of the rolling load cells 143 in the array 141, the response times of the rolling load cells 143 for registering load data of the items, and other factors that may be known to persons of skill in the art. In addition, in some embodiments, more accurate load data may be achieved through processing the load data over a finite time horizon rather than by taking discrete measurements at particular points in time.

A low pass filter is used in preferable embodiments to suppress mechanical noise on load data measurement. The measuring frequency is preferably chosen empirically based on the experimental data. Persons skilled in the art will understand that measuring frequency can also be obtained in a more systematic way. In addition, in some embodiments, more advanced filtering techniques (e.g., Bessel filter) can be used to improve the accuracy of weight determination.

For data redundancy, by increasing the number of roller load cells 143, the accuracy and the reliability of the measured load data for the items will significantly improve by the recursive refinement of the load estimation through redundant measurements.

Persons skilled in the art may appreciate that there are several ways to account for the generation of mechanical noise. For roller load cells using strain gauges, a mechanical damper can be incorporated into the cantilevered beam of the roller load cell. In other embodiments, other types of load data measurement devices, which are capable of suppressing the mechanical noise by active feedback control, may be used. As may be known by persons skilled in the art, two types of prior art active vibration control include: (a) the EMFR (Electromagnetic Force Restoration) sensor; and the (b) SAW (Surface Acoustic Wave) sensor.

Preferably, mechanical noise is reduced by combining the existing strain gauge-based load cells with fluid dampers (i.e., dampened load cells). Fluid dampened load cells are known in the prior art and are common in the industry for speed weighing.

For the EMFR sensor, an inductive coil is charged to float the wheel assembly support, on which the rolling wheel assembly is mounted, in an electromagnetic field. Weight variance causes the movement of a ferrous material through the coil to create a fluctuation in the coil current proportional to the weight of an item. EMFR sensors are preferably adapted to actively suppress mechanical noise as may be known in the prior art.

Persons skilled in the art may understand that EMFR sensor technology is more expensive than either standard or enhanced prior art load cells. Recently, however, EMFR sensor technology has been implemented in industrial applications providing more cost effective solutions as well as increased ruggedness and capacity of the load cells. Currently, there are two major suppliers of EMFR sensors for high performance check-weighers known in the art: Mettler-Toledo International Inc. (Mississauga, Canada) and Wipotec North America (Georgia, US).

SAW sensors (e.g., the SAW-C Scale offered by Wipotec North America (Georgia, US)), are used in the prior art for weighing electronic components and are a class of micro-electro-mechanical systems (MEMS) which rely on the modulation of surface acoustic waves to detect a physical phenomenon. The SAW sensor transduces an input electrical signal into a mechanical wave which, unlike an electrical signal, can be easily influenced by physical phenomena, such as displacement due to a load. A device transduces this mechanical wave back into an electrical signal. Persons skilled in the art may understand that changes in the amplitude, phase, frequency, or time-delay between the input and output electrical signals can be used to generate load data.

Motorized Roller and Speed Control

In preferable embodiments, the rolling element 501 or roller load cell 143 is actuated to control the speed of items across the array 141 and/or to optimize the accuracy of the measured load data. Preferably, with reference to FIG. 4, the system 100 is adapted such that the items 22a-c move at a different speed (e.g., more slowly) over the array 141 without affecting the overall speed of the conveyor belt 30b,c. For example, if the overall speed of the conveyor is 1 m/s, there would be a section that runs at 2 m/s followed by a load measuring section (i.e., the array 141) that runs at a lower speed (e.g., 0.5 m/s).

Conveyor Load Cells

Figure 14A:
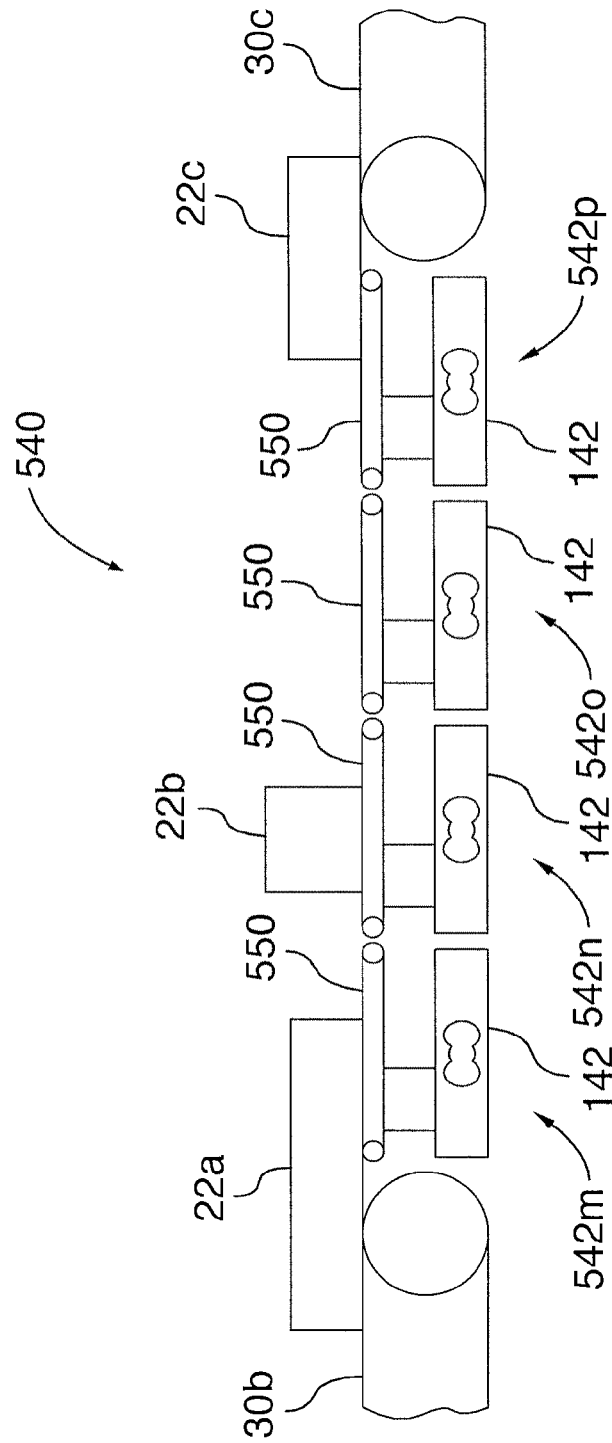
FIGS. 14A and 14B are side and plan views of an array with a plurality of load cells according to another embodiment of the invention.
Figure 14B:
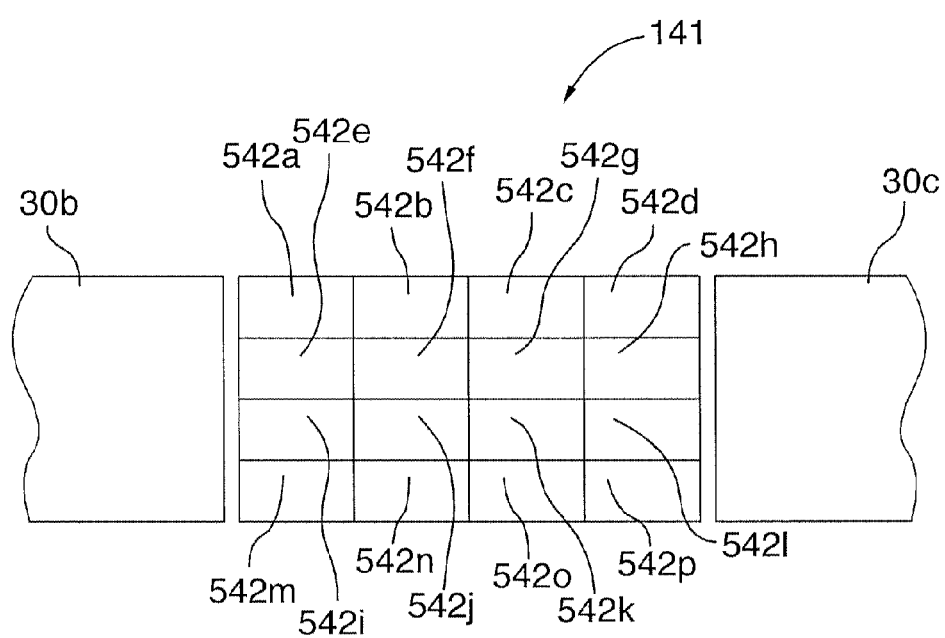

In yet another embodiment, array 140 may have a series of load cells that provide for the movement of items rather than a single conveyor belt as provided in other embodiments. In this embodiment, conveyor belt 32, or a portion thereof, may be replaced with a system of conveyor load cells (e.g., the Weigh Cell EC-FS+NT30 Conveyor Weighing Kit offered by Wipotec North America (Roswell, Ga.), the Weigh cell SW-FS+NT17 Weighing Kit offered by Wipotec North America (Roswell, Ga.)), over which items 22a-c may pass over. Conveyor load cells, as known in the prior art, may comprise a conveyor 550 projecting from a first or loading end of the load cell 142 (see for example FIG. 14A). In one embodiment of the invention, as shown in FIG. 14A, conveyor load cells 542m, 542n, 542o, 542p, facilitate the transition of items 22a-c between conveyors 30b,c. Load data for the items 22a-c may preferably be measured as the items are carried across the load cells 542m-p. FIG. 14B shows an array 540 positioned between conveyors 30b,c, preferably including conveyor load cells 542a, 542b, 542c, 542d, 542e, 542f, 542g, 542h, 542i, 542j, 542k, 542l, 542m, 542n, 542o, 542p which may be arranged in a grid or brick-like pattern. Preferably such pattern is sufficient to allow items 22a-c to transition across array 540 while producing the necessary load data for the determination of item weight in accordance with the present invention. It will also be understood that not all of the conveyor load cells 542a-p need to be functional in that they provide the necessary load data. In a preferred embodiment, conveyor load cells 542a-p may be weight determining, but it is not necessary that all conveyor load cells 542a-p do so.

In preferable embodiments, each of the conveyors associated with the conveyor load cells 542a-p, move at the same speed to transition the items 22a-c across the array 540. Persons skilled in the art, however, will understand that conveyor load cells 542a-p may also move at different speeds relative to one another in order to manipulate the position or orientation of the items 22a-c.

Conveyor Belt Load Cells

Figure 15A:
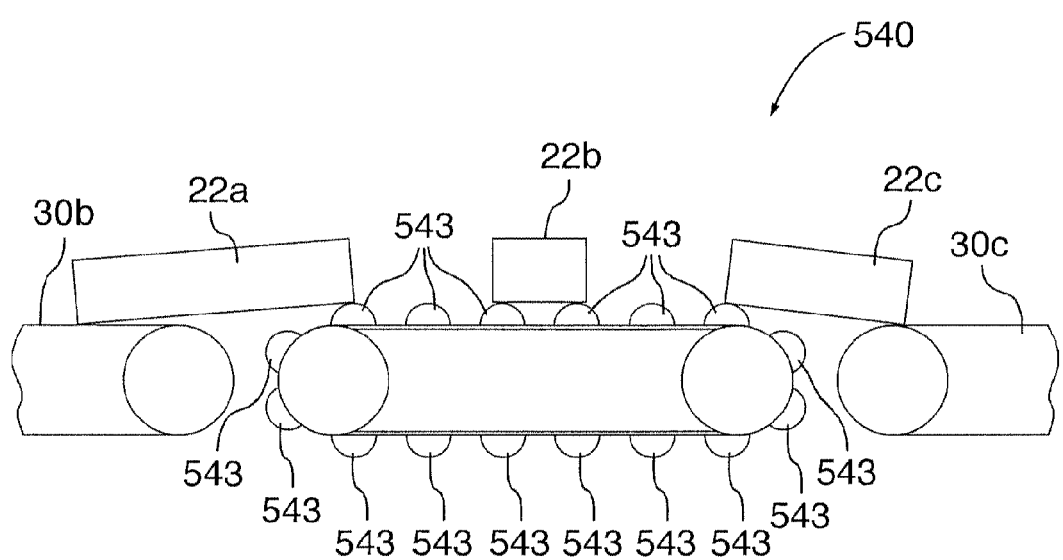
FIGS. 15A and 15B are side and plan views of an array with a plurality of load cells according to one embodiment of the invention.

In yet another embodiment, the conveyor belt 32 (or a portion thereof) of conveyor 30a may comprise load cells (e.g., a thin film force/load sensing units or bubble actuators that may be known by persons skilled in the art, for example, the Metawear sensors offered by mbientlab, San Francisco, Calif.). Conveyor belt load cells 543 are preferably formed using a compliant material (e.g. high strength flexible polyurethane rubber) to facilitate contact between the items 22a-c and the load cells, and may be embedded in the conveyor belt 32 or project from a surface thereof, as shown in FIG. 15A. In preferable embodiments, the conveyor belt load cells 543 are adapted for use with the communication network 300 to transmit load data 181, 282 between the load determining subsystem 110 and the courier subsystem 200.

Figure 15B:
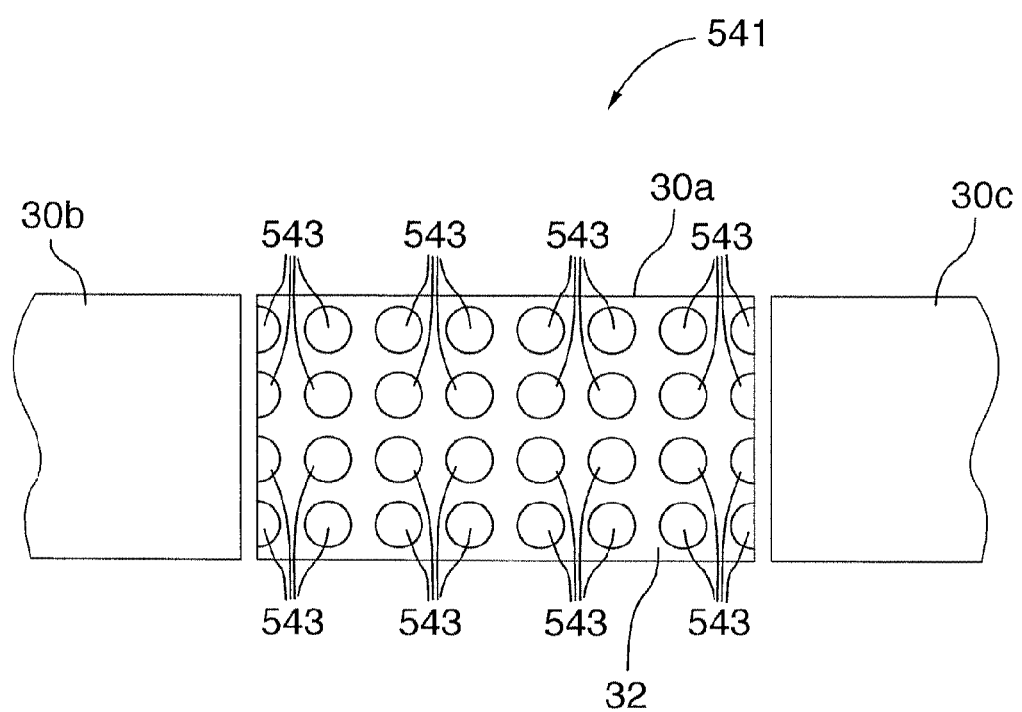

Preferably, each item 22a-c will bear upon a specific set of conveyor belt load cells as they transition across the conveyor 30a. In one embodiment of the invention, as shown in FIG. 15B, a plurality of conveyor belt load cells 543 may be arranged in a grid or brick-like pattern to form an array 541 positioned between conveyors 30b,c. Preferably such pattern is sufficient to allow items 22a-c to be carried along array 541 while producing the necessary load data, from the specific sets of conveyor belt load cells, for the determination of item weight in accordance with the present invention. It will also be understood that not all of the conveyor belt load cells 543 need to be functional in that they provide the necessary load data. In a preferred embodiment, conveyor belt load cells 543 may be weight determining, but it is not necessary that all conveyor belt load cells 543 do so.

Although the conveyor belt load cells 543 depicted in FIGS. 15A and 15B are rounded, persons skilled in the art will appreciate that the load cells 543 used in accordance with the present invention may be any shape (e.g., rectangular, triangular, polygon, etc.).

Figure 16A:
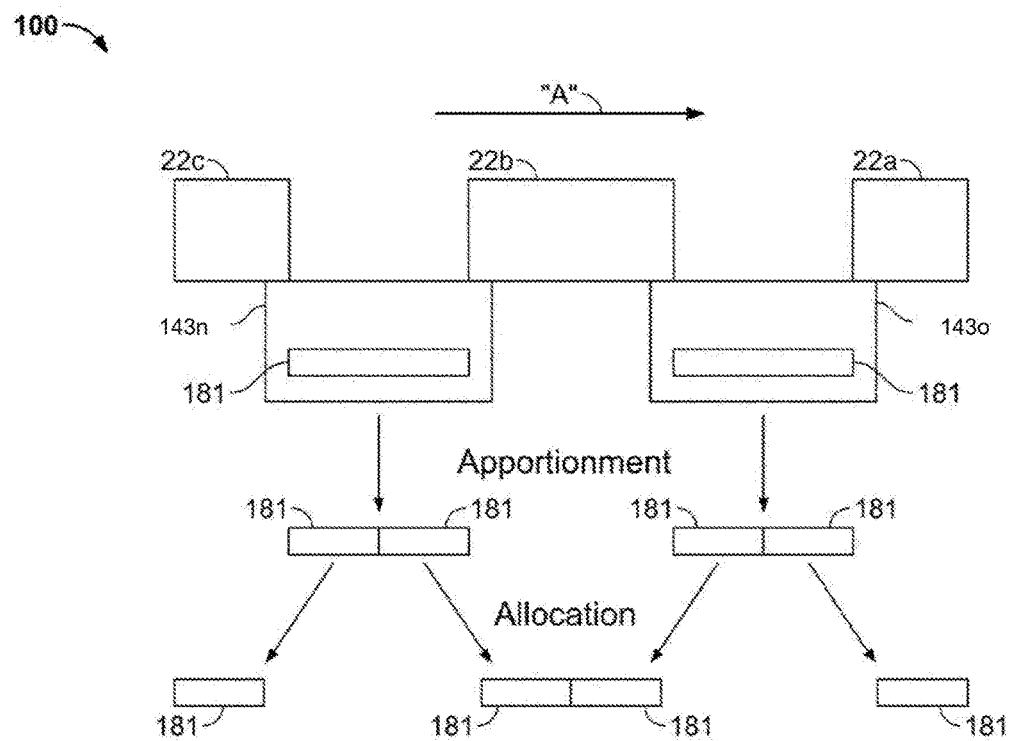
FIGS. 16A, 16B and 16C are schematic diagrams of load data apportionment and allocation according to preferred embodiments of the invention.
Figure 16B:
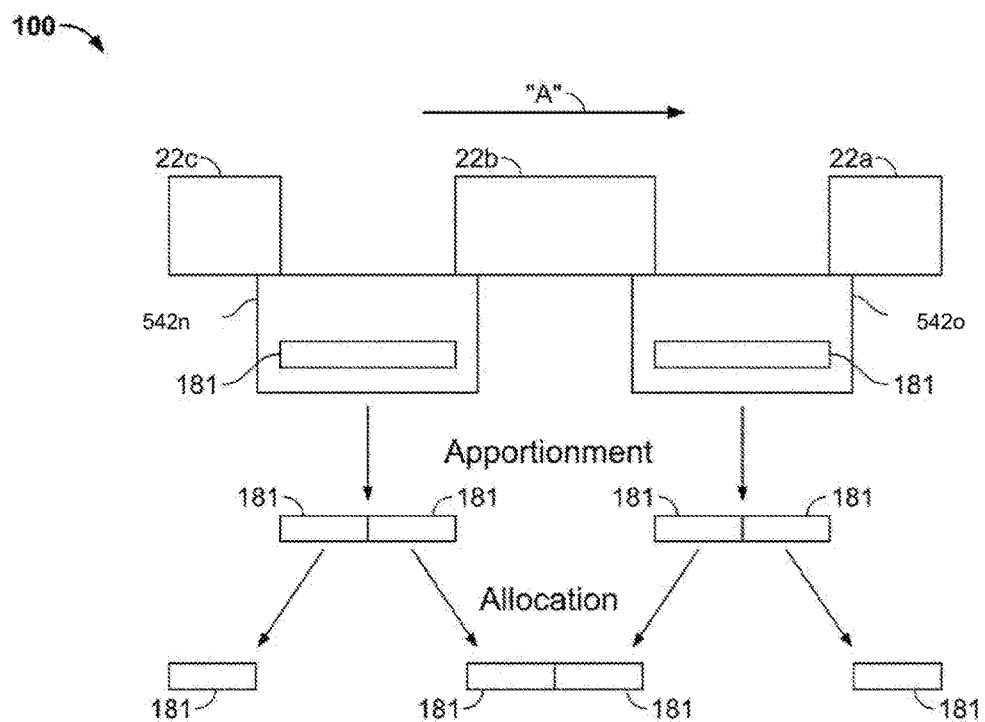
Figure 16C:
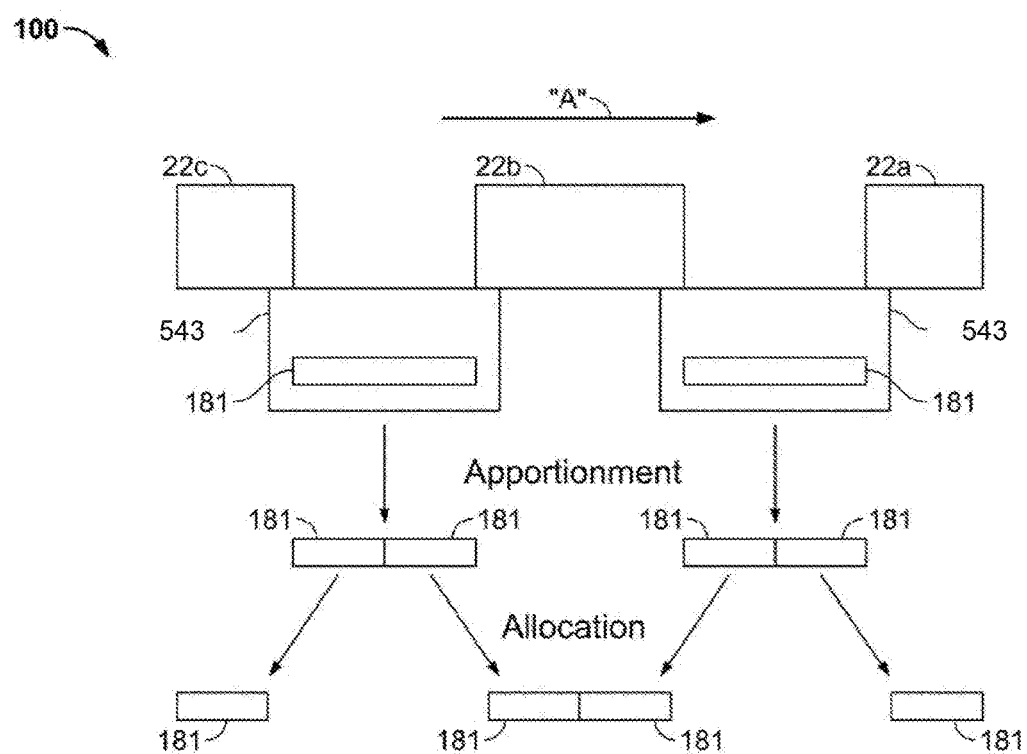

In FIGS. 16A, 16B and 16C, items 22a, 22b, 22c are shown moving in the downstream direction "A" over roller load cells 143n and 143o, conveyor load cells 542n and 542o, and conveyor belt load cells 543, respectively. Item 22a is shown bearing upon roller load cell 143o (FIG. 16A), conveyor load cell 542o (FIG. 16B), and conveyor belt load cell 543 (FIG. 16C), item 22b is shown bearing upon roller load cell 143n and 143o (FIG. 16A), conveyor load cells 542n and 542o (FIG. 16B), and conveyor belt load cells 543 (FIG. 16C), and item 22c is shown bearing upon roller load cell 143n (FIG. 16A), conveyor load cell 542n (FIG. 16B), and conveyor belt load cell 543 (FIG. 16C). Load cell data 181 from the roller load cell 143o (FIG. 16A), conveyor load cell 542o (FIG. 16B), and conveyor belt load cell 543 (FIG. 16C) is shown apportioned into load cell data 181, 181 as between items 22a and 22b. Load cell data 181 from roller load cell 143n (FIG. 16A) conveyor load cell 542n(FIG. 16B), and conveyor belt load cell 543 (FIG. 16C) is shown apportioned into load cell data 181, 181 as between items 22b and 22c. Load cell data 181 from roller load cell 143o (FIG. 16A), conveyor load cell 542o (FIG. 16B), and conveyor belt load cell 543 (FIG. 16C) is allocated to item 22a. Load cell data 181, 181 from roller load cells 143n and 143o (FIG. 16A), conveyor load cells 542n and 542o (FIG. 16B), and conveyor belt load cells 543 (FIG. 16C) are allocated to item 2b. Load cell data 181 from roller load cell 143n ((FIG. 16A), conveyor load cell 542n (FIG. 16B), and conveyor belt load cell 543 ((FIG. 16C) is allocated to item 22c.

Thus, the system, method, and computer readable medium operatively facilitate increasing revenue associated with the weight of items which are configured in singulated, non-singulated, spaced, and non-spaced arrangements.

An alternative aspect of the present invention may relate to quality control using weight determination as a means for identifying a defect. In a mass flow environment the array may be used to detect items 22 (generally) that are below a predetermined weight threshold. Items 22 (generally) that are below the predetermined weight threshold may be deemed unfit for continued processing. This aspect of the present invention may be useful in a manufacturing environment for example.

The system, method, and computer readable medium are preferably adapted and/or adaptable for use in parcel delivery, postal applications, and manufacturing. In parcel delivery and postal applications, the system, method, and computer readable medium are preferably adapted for transport of items (generally) through facilities, for transport to trailers, for transport of parcels, and to improve or facilitate movement of freight.

Persons having ordinary skill in the art may appreciate that some embodiments of the system and/or method according to the present invention may be adapted for use with: (a) a Trak3 automated material handling solution offered by Real Time Solutions; (b) a PILAR CS5200 (or CSN210) MassFlow dimensioner offered by Mettler Toledo; and/or (c) a PowerScan 8000 Series scanner offered by Datalogic.

This concludes the description of presently preferred embodiments of the invention. The foregoing description has been presented for the purpose of illustration and is not intended to be exhaustive or to limit the invention to the precise form disclosed. Other modifications, variations and alterations are possible in light of the above teaching and will be apparent to those skilled in the art, and may be used in the design and manufacture of other embodiments according to the present invention without departing form the spirit and scope of the invention. It is intended the scope of the invention be limited not by this description but only by the claims forming a part hereof.

The embodiments for which an exclusive privilege or property is claimed are as follows:

1. A weight determining system for use with singulated, non-singulated, spaced, and non-spaced arrangement of items on a conveyor system, said weight determining system comprising:
    (a) an array of load cells associated with the conveyor system, wherein said array is configured to have each of the items bear upon one or more of said load cells, wherein said each of the items is in adjacent and/or neighboring relation with said one or more of said load cells, and wherein each of said load cells is configured to: (i) bear one or more of the items; and (ii) generate load data associated with said one or more of the items;
    (b) a scanning apparatus configured to generate scan data corresponding to the arrangement of the items on the conveyor system; and
    (c) one or more processors encoded to: collect said load data and said scan data; and based on said scan data:
        (i) apportion said load data, from said each of said load cells, to said one or more of the items which are in said adjacent and/or neighboring relation therewith;
        (ii) allocate said load data, apportioned as aforesaid, to said each of the items from said one or more of said load cells which are in said adjacent and/or neighboring relation therewith; and
        (iii) determine a weight for said each of the items in the arrangements based on said load data apportioned and allocated as aforesaid;
    wherein at least one of said load cells of said array is a roller load cell, a conveyor load cell, or a conveyor belt load cell.

2. A weight determining system according to claim 1, wherein said processors are further encoded to, based on the scan data; determine when one of the items bears upon two or more of said load cells; and then collect and allocate said load data, from said two or more of said load cells, to said one of the items.

3. A weight determining, system according to one of claim 1, wherein said processors are further encoded to, based on the scan data: determine when one of said load cells bears two or more of the items; and then collect and apportion said load data, from said one of said load cells, to said two or more of the items.

4. A weight determining system according to claim 1, further comprising one or more databases to store said load data, said scan data, and said weight for said each of the items.

5. A weight determining system according to claim 1, wherein said scanning apparatus comprises a speed determining device configured to determine a speed of the conveyor system; and wherein when said load data is generated at a different time than said scan data, said processors are further encoded to: generate speed data corresponding to the, speed of the conveyor system; and, based on said speed data, apportion and allocate said load data as aforesaid.

6. A weight determining system according to claim 5, wherein said processors are further encoded to, based on said scan data and said speed data, determine the locations of the items in the arrangement relative to said one or more of said load cells of said array.

7. A weight determining system according to claim 6, wherein the processors are further encoded to, based on the locations of the items, determine said one or more of said load cells from which said load data is to be collected for said each of the items.

8. A weight determining system according to claim 1, wherein the scanning apparatus is further configured to read a unique identification tag associated with said each of the items; and wherein the processors are further encoded to associate said unique identification tag with said weight for said each of the items.

9. A weight determining system according to claim 8, wherein the processors are further encoded to generate an alert for presentation to a user when said weight differs from predetermined weight data associated with said unique identification tag.

10. A weight determining system according to claim 1, wherein said processors are further encoded to, based on said scan data, determine dimension data for said each of the items.

11. A weight determining system according to claim 1, wherein, on a plan view of said array, laterally adjacent ones of said load cells are longitudinally offset from one another.

12. A weight determining system according to claim 1, wherein as the conveyer system bears said each of the items over said array, said weight for said each of the items is determined two or more times.

13. A weight determining system according to claim 1, wherein said array is configured, relative to the items, such that said each of the items bears upon a first set of said load cells and later, as the conveyer system bears said each of the items over said array, upon a second set of said load cells disjoint from said first set.

14. A weight determining system according to claim 1, wherein a size of said each of said load cells is predetermined based on a size of the items.

15. A weight determining system according to claim 1, wherein the weight is used for recovery of costs associated with the items on the conveyer.

16. A weight determining method for use with singulated, non-singulated, spaced, and non-spaced arrangement of items on a conveyor system, said method comprising the steps of:
    (a) conveying each of the items to bear upon one or more load cells in an array, wherein said each of the items is in adjacent and/or neighboring relation with said one or more of said load cells, with each of said load cells: (i) bearing one or more of the items; and (ii) generating load data associated with said one or more of the items;
    (b) using a scanning apparatus to generate scan data corresponding to the arrangement of the items on the conveyor system; and
    (c) using one or more processors to: collect said load data and said scan data; and based on said scan data:
        (i) apportion said load data, from said each of said load cells, to said one or more of the items which are in said adjacent and/or neighboring relation therewith;
        (ii) allocate said load data, apportioned as aforesaid, to said each of the items from said one or more of said load cells which are in said adjacent and/or neighboring relation therewith; and (iii) determine a weight for said each of the items in the arrangements based on said load data apportioned and allocated as aforesaid;

wherein said one or more load cells is a roller load cell, a conveyor load cell, or a conveyor belt load cell.

17. A weight determining method according to claim 16, wherein in step (c), said processors are further used to, based on the scan data: determine when one of the items bears upon two or more of said load cells; and then collect and allocate said load data, from said two or more of said load cells, to said one of the items.

18. A weight determining method according to claim 16, wherein in step (c), said processors are further used to, based on the scan data: determine when one of said load cells bears two or more of the items; and then collect and apportion said load data, from said one of said load cells, to said two or more of the items.

19. A weight determining method according to claim 16, further comprising a step of using one or more databases to store said load data, said scan data, and said weight for said each of the items.

20. A weight determining method according to claim 16, wherein in step (b), a speed determining device of said scanning apparatus determines a speed of the conveyor system; and wherein in step (c), when step (a) is performed at a different time than step (b), said processors are further used to: generate speed data corresponding to the speed of the conveyor system; and, based on said speed data, apportion and allocate said load data as aforesaid.

21. A weight determining method according to claim 20, wherein in step (c), said processors are further used to, based on said scan data and said speed data, determine the locations of the items in the arrangement relative to said one or more of said load cells of said array.

22. A weight determining method according to claim 21, wherein in step (c), the processors are further used to, based on the locations of the items, determine said one or more of said load cells from which said load data is to be collected for said each of the items.

23. A weight determining method according to claim 16, wherein in step (b), the scanning apparatus is further used to read a unique identification tag associated with said each of the items; and wherein in step (c), the processors are further used to associate said unique identification tag with said weight for said each of the items.

24. A weight determining method according to claim 23, wherein in step (c), the processors are further used to generate an alert for presentation to a user when said weight differs from predetermined weight data associated with said unique identification tag.

25. A weight determining method according to claim 16, wherein in step (c), said processors are further used to, based on said scan data, determine dimension data for said each of the items.

26. A weight determining method according to claim 16 wherein before steps (a) through (c), laterally adjacent ones of said load cells are longitudinally offset from one another.

27. A weight determining method according to claim 16, wherein as the conveyer system bears said each of the items over said array, said weight for said each of the items is determined two or more times.

28. A weight determining method according to claim 16, wherein before steps (a) through (c), said array is configured, relative to the items, such that said each of the items bears upon a first set of said load cells and later, as the conveyer system bears said each of the items over said array, upon a second set of said load cells disjoint from said first set.

29. A weight determining method according to claim 16, wherein before steps (a) through (c), a size of said each of said load cells is determined based on a size of the items.

30. A weight determining system according to claim 16, further comprising a step of using the weight for recovery of costs associated with the items on the conveyor system.

31. A non-transitory computer readable medium for use with:

singulated, non-singulated, spaced, and non-spaced arrangements of items on a conveyor system; an array of load cells associated with the conveyor system, with the array configured to have each of the items bear upon one or more of the load cells, wherein said each of the items is in adjacent and/or neighboring relation with said one or more of said load cells, and with each of the load cells configured to bear one or more of the items and generate load data associated with said one or more of the items; and a scanning apparatus which generates scan data corresponding to the arrangement of the items on the conveyor system;

with the computer readable medium comprising executable instructions which are physically stored thereon and which, upon execution, encode one or more processors to:

(a) collect the load data and the scan data; and
(b) based on the scan data:
(i) apportion the load data, from said each of said load cells, to said one or more of the items which are in said adjacent and/or neighboring relation therewith;
(ii) allocate the load data, apportioned as aforesaid, to said each of the items from said one or, more of said load cells which are in said adjacent and/or neighboring relation therewith; and
(iii) determine a weight for said each of the items in the arrangements based on the load data apportioned, and allocated as aforesaid;

wherein at least one of said load cells of said array is a roller load cell, a conveyor load cell, or a conveyor belt load cell.

32. A weight determining system according to claim 1, wherein the at least one of said load cells is a roller load cell.

33. A weight determining system according to claim 32, further comprising a support surface to support the items as they travel across the roller load cell.

34. A weight determining system according to claim 32, wherein the array is at an inclined position.

35. A weight determining system according to claim 1, wherein the at least one of said load cells is a conveyor load cell.

36. A weight determining system according to claim 35 comprising at least two conveyor load cells.

37. A weight determining system according to claim 36, wherein the at least two conveyor load cells move at the same speed.

38. A weight determining system according to claim 36, wherein the at least two conveyor load cells move at different speeds.

39. A weight determining system according to claim 1, wherein the at least one of said load cells is a conveyor belt load cell.

40. A weight determining method according to claim 16, wherein in step (a), said one or more load cells is a roller load cell.

41. A weight determining method according to claim 40, wherein in step (a), a support surface is used to support the items as they travel across the roller load cell.

42. A weight determining method according to claim 40, wherein in step (a), the array is positioned at an incline.

43. A weight determining method according to claim 16, wherein in step (a), said one or more load cells is a conveyor load cell.

44. A weight determining method according to claim 43, comprising at least two conveyor load cells.

45. A weight determining method according to claim 44, wherein in step (a), the at least two conveyor load cells move at the same speed.

46. A weight determining method according to claim 44, wherein in step (a), the at least two conveyor load cells move at different speeds.

47. A weight determining system according to claim 16, wherein in step (a), said one or more load cells is a conveyor belt load cell.

48. A weight determining system according to claim 1, wherein the weight for said each of the items is determined at a frequency from about 5.5 Hz to about 12 Hz.

49. A weight determining method according to claim 16, wherein in substep (c)(iii), the one or more processors determines a weight for said each of the items at a frequency from about 5.5 Hz to about 12 Hz.

50. A non-transitory computer readable medium according to claim 31, wherein the weight for said items on the conveyor system is determined at a frequency from about 5.5 Hz to about 12 Hz.

* * * * *